(12) United States Patent
Uola et al.

(10) Patent No.: US 9,529,603 B2
(45) Date of Patent: Dec. 27, 2016

(54) METHOD AND APPARATUS FOR DYNAMIC NETWORK DEVICE START UP

(75) Inventors: Juha Tapani Uola, Tampere (FI); Antero Taivalsaari, Siivikkala (FI)

(73) Assignee: Nokia Technologies Oy, Espoo (FI)

( * ) Notice: Subject to any disclaimer, the term of this patent is extended or adjusted under 35 U.S.C. 154(b) by 360 days.

(21) Appl. No.: 12/829,928

(22) Filed: Jul. 2, 2010

(65) Prior Publication Data

US 2012/0005586 A1 Jan. 5, 2012

(51) Int. Cl.
*G06F 9/44* (2006.01)

(52) U.S. Cl.
CPC ................... *G06F 9/4416* (2013.01)

(58) Field of Classification Search
CPC ....................................... G06F 9/4416
See application file for complete search history.

(56) References Cited

U.S. PATENT DOCUMENTS

| | | | |
|---|---|---|---|
| 5,815,148 A | 9/1998 | Tanaka | |
| 2003/0107591 A1 | 6/2003 | Jameson | |
| 2006/0291481 A1* | 12/2006 | Kumar | H04L 29/06027 370/400 |
| 2007/0081654 A1* | 4/2007 | Toy et al. | 379/211.02 |
| 2008/0064394 A1* | 3/2008 | Maes | 455/432.1 |
| 2008/0134045 A1* | 6/2008 | Fridman | G06F 8/60 715/735 |
| 2008/0177460 A1 | 7/2008 | Blackwood et al. | |
| 2009/0320012 A1* | 12/2009 | Lee | G06F 8/65 717/168 |
| 2010/0233996 A1* | 9/2010 | Herz et al. | 455/411 |
| 2011/0055683 A1* | 3/2011 | Jiang | G06F 17/30899 715/234 |
| 2011/0275358 A1* | 11/2011 | Faenger | 455/420 |

FOREIGN PATENT DOCUMENTS

| | | |
|---|---|---|
| KR | 10-0852652 B1 | 8/2008 |
| WO | WO 00/33208 A2 | 6/2000 |
| WO | WO 02/44977 A1 | 6/2002 |
| WO | WO 2008/008995 A2 | 1/2008 |

OTHER PUBLICATIONS

PCT International Search Report dated Oct. 3, 2011 for PCT/FI2011/050489.
PCT Notification of Transmittal of the International Search Report and the Written Opinion of the International Searching Authority, or the Declaration dated Oct. 3, 2011 for PCT/FI2011/050489.
PCT Written Opinion on the International Searching Authority dated Oct. 3, 2011 for PCT/FI2011/050489.

* cited by examiner

*Primary Examiner* — Suraj Joshi
(74) *Attorney, Agent, or Firm* — Alston & Bird LLP

(57) ABSTRACT

Techniques for dynamic device start up include causing the following steps in response to powering a device. A server is determined, which provides at least a portion of a user interface to operate the device. If a communications network is available, a request message is sent to the server. The request message indicates at least a request for at least first data describing at least the portion of the user interface. The user interface is rendered based at least in part on the first data. In some embodiments, a server determines first data that describes at least a portion of a user interface for a remote device. The user interface is an interface for receiving input at the remote device to operate the remote device. In response to receiving a start-up message indicating start up of the remote device, at least the first data is sent to the remote device.

20 Claims, 12 Drawing Sheets

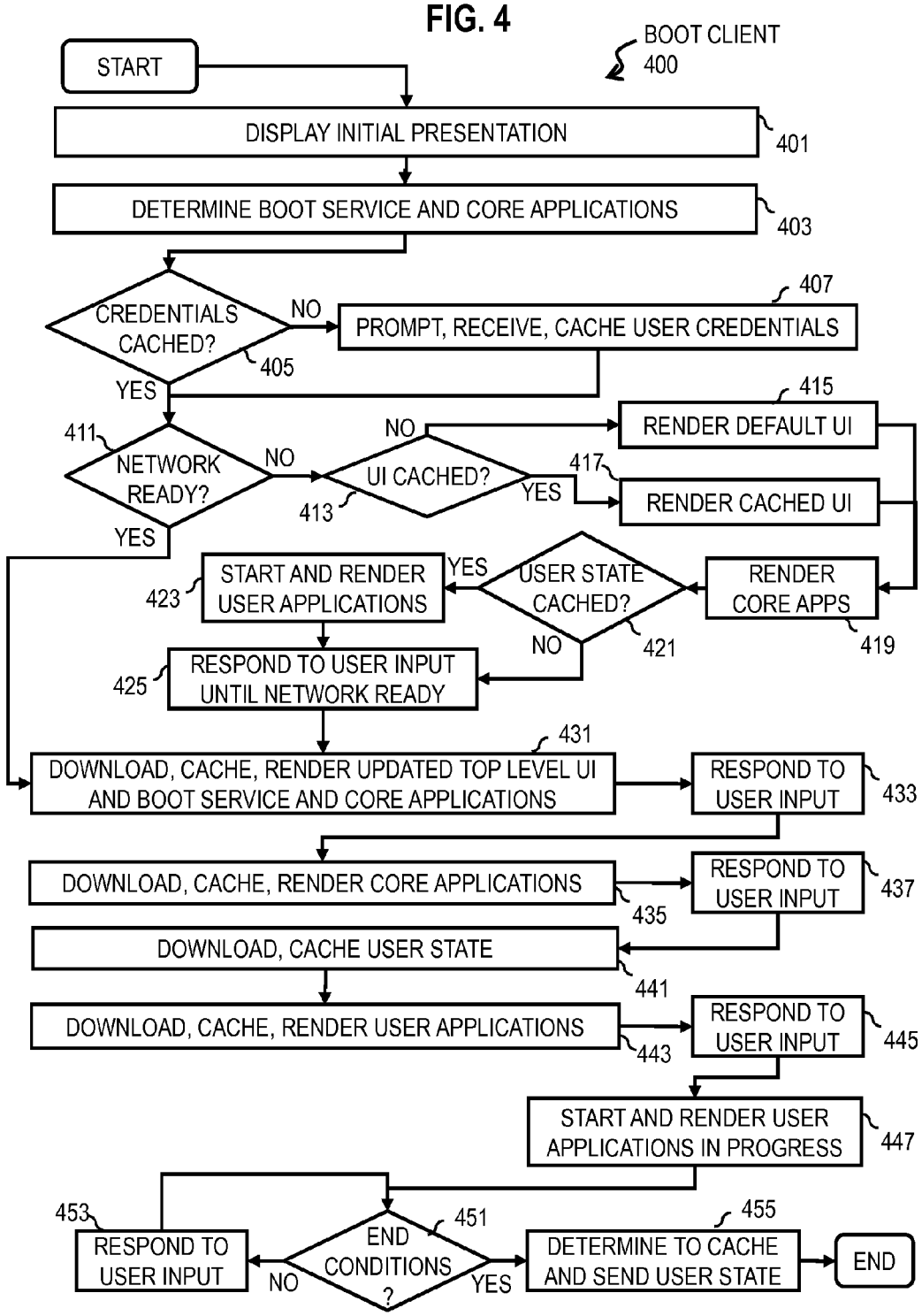

METHOD AND APPARATUS FOR DYNAMIC NETWORK DEVICE START UP

BACKGROUND

Network service providers and device manufacturers (e.g., wireless, cellular, etc.) are continually challenged to deliver value and convenience to consumers by, for example, providing compelling network services. As a consequence, many network device manufacturers are installing software controlled tools, applications and other features that can be upgraded over time, adding more functionality or efficiency. However, when a consumer obtains such a device, the installed software may be out of date. Typically a user starts up the device and is presented with a static top level user interface. The user must then request or be prompted to connect to a communications network to determine if an upgrade is available for one or more software items. If such an upgrade is available, the user is further prompted to approve installation. User credentials, such as a user name or password, might be required for some software upgrades. Thus delays in delivery of the software upgrades are experienced by the user's device, and the device's functionality or performance, or both, are inhibited until the user is both prompted and responds affirmatively to the prompt.

SOME EXAMPLE EMBODIMENTS

Some network devices, such as cellular telephones, routinely have broadband network access. It has been determined that such routine broadband access offers an opportunity to provide dynamic top level user interfaces automatically upon starting up the device. This enables all users of a manufacturer's product to be presented with the latest user interface to operate and otherwise interact with the device, whether the device was just obtained or has been already in the user's possession for several months or years. Therefore, there is a need for an approach for automatic dynamic network device start-up.

According to one embodiment, a method comprises several steps performed in response to powering on a network device. The network device includes or is connected to a display for presenting a user interface. The method comprises determining a first server. The first server provides at least a portion of a user interface for the device. The user interface is an interface for receiving input to operate the device. The method also comprises determining whether a communications network is available. The method further comprises, if the communications network is available, determining to send a request message to the first server. The request message comprises at least a request for at least first data describing at least the portion of the user interface.

According to another embodiment, a method comprises determining first data that describes at least a portion of a user interface for a remote device. The user interface is an interface for receiving input at the remote device to operate the remote device. The method also comprises receiving a start-up message that indicates at least that the remote device is being powered up. The method further comprises, in response to receiving the start-up message, determining to send at least the first data to the remote device.

According to another embodiment, an apparatus comprises at least one processor, and at least one memory including computer program code, the at least one memory and the computer program code configured to cause the apparatus to perform at least one or more steps of one of the above methods.

According to another embodiment, a computer-readable storage medium carries one or more sequences of one or more instructions which, when executed by one or more processors, cause, at least in part, an apparatus to perform one or more steps of one of the above methods.

According to another embodiment, an apparatus comprises means for performing one or more steps of one or the above methods.

According to another embodiment, a computer program product includes one or more sequences of one or more instructions which, when executed by one or more processors, cause an apparatus to at least perform one or more steps of one of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a boot client process for automatic dynamic network device start-up, according to one embodiment;

DESCRIPTION OF SOME EMBODIMENTS

Figure 1:
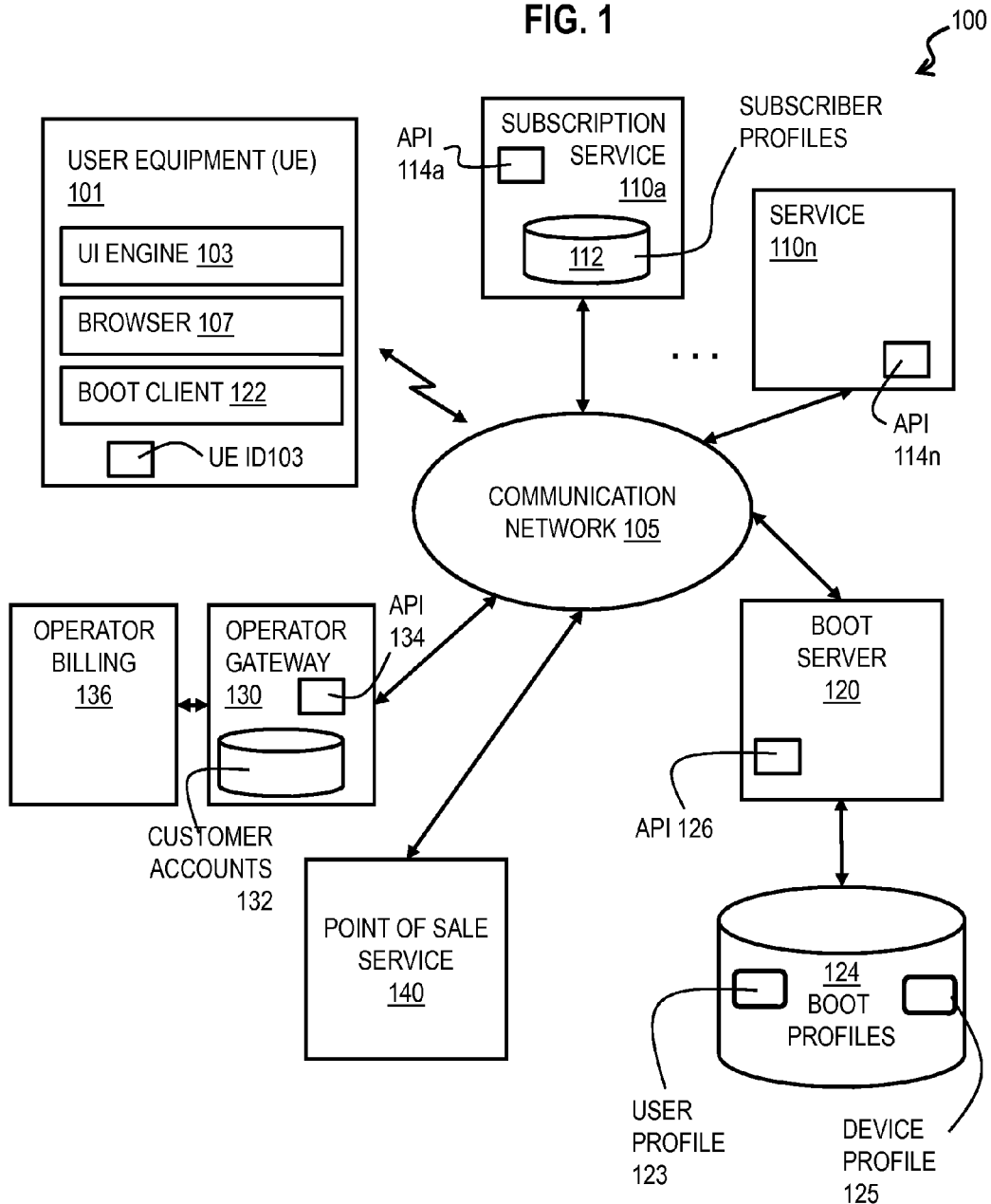
FIG. 1 is a diagram of a system capable of automatic dynamic network device start-up, according to one embodiment.

Examples of a method, apparatus, and computer program are disclosed for automatic dynamic network device start-up. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term user interface refers to any software controlled mechanism to exchange data between a device and a user of that device, and includes not just graphical user interfaces that involve a video screen and pointing device to control a cursor, or a video touch screen, but also audio interfaces that involve speakers and microphones among other interfaces that may be developed, such as interfaces involving tactile, chemical, and electromagnetic transducers. As used herein, the term display represents any means for presenting data to a user, including video output and audio output, alone or in some combination. The term rendering, in the context of rendering data, is used synonymously with presenting such data. As used herein, a network device is any device that communicates with other devices over a communications network. The term top level user interface refers to a user interface for receiving input from a user of the device to operate the device. Thus the top level user interface is used, in various, to perform one or more of the following: turn the device off, select one or more operations to perform with the device (like make a call, record audio or video, set a clock, determine geographic position, etc.), switch between one operation and another, change settings for default behavior, download and render content, and download or install or delete or execute one or more software applications on the device. When a device is started up, e.g., by pressing the power button, the device automatically runs some software to check the device hardware and start processes essential for the user to operate the device. This is akin to the old adage of lifting oneself up by one's own bootstraps, and the process is called bootstrapping, or booting up. As used herein boot means a process that is executed upon starting a network device. An application is a process that is implemented in software for execution on a network device. The application may operate alone on the device, or may communicate over a network with a service on a separate network device.

Although various embodiments are described with respect to starting up a cellular telephone with a video screen and one or more keys whose functions are determined by labels displayed on the screen, it is contemplated that the approach described herein may be used with other network devices, including personal computers with wireless cards, devices with touch screens, or devices with no video screens, among many other network devices well known in the art.

FIG. 1 is a diagram of a system 100 capable of automatic dynamic network device start-up, according to one embodiment. The system 100 includes user equipment (UE) 101, which is a network device of a user in communication with network 105. In prior approaches, when the UE 101 is turned on, a static programmed user interface is presented that can become out of date compared with the operations and features currently available for other devices of the same type. The user of UE 101 has be prompted to connect to the network 105 and look for updates, then give permission for the updates to be installed. This is wasteful of resources on the UE 101, tasks and functions that could be performed are delayed until the user responds to these prompts. Often the user does not have the expertise to decide whether certain upgrades are desirable or necessary. Thus useful functions may be prevented from being added to the UE 101.

To address this problem, a system 100 of FIG. 1 introduces the capability for automatic dynamic network device start-up by automatically running a boot client process 122 that connects to a boot server process 120 on another network device to download data used to provide a top level user interface. The network device start-up is dynamic because it can change based on the data sent from the boot server process 122. The dynamic network device start-up is automatic because it is done without intervention by the user once the device is started (e.g., by the user pressing a power button).

As shown in FIG. 1, the system 100 comprises a user equipment (UE) 101 having connectivity to network services (such as subscription service 110a and service 110n, collectively called network services 110, hereinafter) and to boot server 120 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In the illustrated embodiment, the system 100 also includes an operator gateway process 130 for an operator that provides access to the network 105 for the UE 101. In the illustrated embodiment, the system 100 also includes point of sale service 140 for a store, e.g., a retail store, where the UE 101 was purchased.

By way of example, the UE 101, boot server 120, network services 110, operator gateway 130 and point of sale service 140 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Processes executing on various devices, often communicate using the client-server model of network communications, widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web (WWW) servers that provide web pages.

In the illustrated embodiment, the UE 101 includes a browser 107, a user interface (UI) engine 103, and boot client 122. The UE 101 also includes a data structure that stores data that indicates UE identifier (ID) 103. In some embodiments, one or more of services 110 interact with a user of UE 101 though the browser 107. In some embodiments, one or more of services 110 interact with a user of UE 101 though a corresponding special software application that functions as a separate client (not shown). Many user interface engines are known in the art; and any may be used as the UI engine 103 in various embodiments. In an example embodiment, the UI engine 103 is a declarative UI engine, as is well known in the art. A declarative UI engine is capable of producing a powerful and complex user interface based on a few instructions, called declarative statements, which indicate what UI elements are to be employed for corresponding input and output data or variables and how those UI elements are arranged. An example declarative UI engine is available as QML (Qt Declarative Markup Language) developed by Qt organization (formerly a separate company called Trolltech) currently available from Nokia Corporation of Espoo, Finland and described in the World Wide Web at domain doc.qt.nokia.com in directory 4.7-snapshot in file declarativeui.html.

Upon start up, boot client process 122 connects to the boot server process 120 on another network device to download data used to provide a top level user interface. More specifically, in response to powering on a network device (e.g., UE 101) that includes a display for presenting a user interface to a user of the device, the boot client 122 causes the device to perform automatically at least determining a first server (e.g., a network address for boot server 120). The boot server 120 provides at least a portion of a top level user interface for the device (e.g., UE 101). The boot client 122 determines whether a communications network is available; and, if the communications network is available, then determines to send a request message to the boot server. The request message indicates a request for first data that describes at least the portion of the top level user interface. In response to receiving the first data from the boot server 120, the boot client 122 renders the top level user interface based at least in part on the first data.

The subscription services, such as subscription service 110a, include corresponding subscriber profiles data structures, such as data structure 112. Each subscriber profiles data structure holds data that indicates information about consumers who have subscribed to the service. While the subscription services 110 interact with the UE 101 through HTTP messages with the browser 107 or messages of the same or different protocols with an application client, other services connected to communication network 105 can access the functionality of the subscriptions services 110 through corresponding application programming interfaces API 114a through API 114n, respectively. These API define parameters, acceptable ranges for values for the parameters, functions performed for certain values of parameters, and a protocol for exchanging the parameter values across network 105.

The operator provides the UE 101 with access to the communications network 105, often in collaboration with one or more other operators. Such access is set up through one or more operator gateway services 130, either directly in some embodiments, or indirectly through a point of sale service 140 provided by a retailer in other embodiments. The consumer information for a user of UE 101 (such as name, social security number, telephone number and billing address or bank account or credit card information) is stored in customer accounts data structure 132. The customer accounts also associates the consumer with the particular UE 101. The UE 101 is identified with a user equipment identifier (UE ID), such as an International Mobile Equipment Identity (IMEI) that is a number, usually unique, to identify GSM, WCDMA, iDEN and some satellite mobile phones. The operator gateway 130 often provides billing services for one or more subscription services 110. In the illustrated embodiment, the operator gateway 130 is connected to an operator billing service 136, either directly, as depicted, or indirectly via network 105, to initiate payment from a consumer for use of network 105 and for use of any subscription services 110. Billing and other functions of operator gateway 130 are accessed through the operator gateway API 134.

The boot server 120 communicates with the boot client 122 upon start up of the UE 101 to pass the latest version of the top level user interface for operating the UE 101. In various embodiments, the boot server 120 either passes the entire dynamic portion of the top level user interface, or just the sub-portion that has changed since the last boot up of the UE 101. The dynamic portion of the top level interface provided by the boot server 120 includes user interactive elements specific to the device (e.g., latest software upgrades for device) or the user (e.g., one or more of the user's subscription services, user-selected applications or the user context, such as geographic location, time of day) or some combination. To determine the proper dynamic response by the boot server 120, the boot server 120 includes a boot profiles data structure 124. In the illustrated embodiment, the boot profiles data structure 124 includes a user profile data structure 123 and a device profile data structure 125. In some embodiments, one or more functions of the boot server 120 can be accessed through a boot server API 126. For example, subscription service 110a can notify the boot server 120 of a change in the contact list for the user through the boot server API 126.

Figure 2:
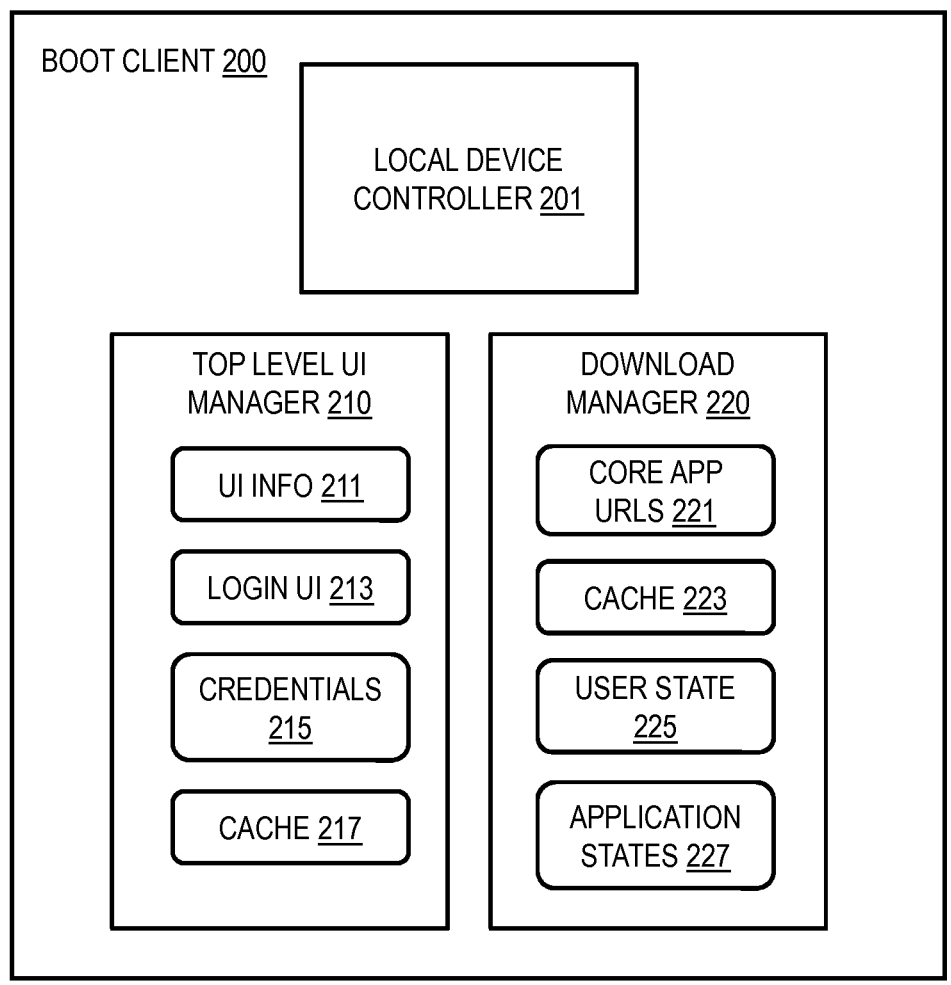
FIG. 2 is a diagram of the components of a boot client, according to one embodiment.

Although components and data structures are shown in FIG. 1 and FIG. 2 as integral blocks in a particular arrangement on particular network devices for purposes of illustration, in other embodiments, components and data structures, or portions thereof, are arranged differently, on one or more network devices or databases, or are omitted, or other components or data structures are included, or the system is changed in some combination of ways. In all embodiments, the boot client 122 resides entirely on each user network device, e.g., entirely on UE 101.

FIG. 2 is a diagram of the components of a boot client 200, according to one embodiment. Boot client 200 is a particular embodiment of the boot client 122 depicted in FIG. 1. By way of example, the boot client 200 includes one or more components for providing automatic dynamic network device start-up. It is contemplated that the functions of these components may be combined in one or more components or performed by other components of equivalent functionality. In this embodiment, the boot client includes a local device controller 201, a top level UI manager 210 and a download manager 220. In some embodiments, the three components operate in parallel, each performing a different set of functions for the boot client 200. As is well known, multiple processes can operate in parallel on a device by splitting time on a single processor under control of a scheduler, or by executing on different processors of a multi-processor device, or some combination.

The local device controller 201 interacts with the local operating system on UE 101 to ascertain or change the status of various hardware components, such as the displays, the keys, the clock, the memory, and one or more electromagnetic transceivers. The local device controller also determines the local context of the device, such as the current geographic location, the local time, and the wireless communications links that are detected. The local device controller 201 also issues messages or commands to the other components of the boot client 200, such as the top level UI manager 210 and the download manager 220, as described in more detail below with reference to FIG. 6, FIG. 7 and FIG. 8.

The top level UI manager 210, assembles the components of the top level UI and issues commands to the UI engine to display the top level UI. The top level UI manager 210 also receives user responses to the top level UI and acts based on those user responses. The actions often involve issuing messages or commands to the other components of the boot client 200, such as the local device controller 201 and the download manager 220, as described in more detail below with reference to FIG. 6, FIG. 7 and FIG. 8. In the illustrated embodiment, the top level UI manager 210 caches information in one or more data structures, including a user interface (UI) information data structure 211, a login user interface data structure 213, a user credentials data structure 215, and a data cache data structure 217.

The UI information data structure 211 holds data that indicates the instructions for the UI engine, such as received, in whole or in part, from the boot server 120. When first installed on the UE 101, the UI information data structure 211 is empty or holds a minimal amount of information, such as a default top level UI. For example, the default UI includes interactive options for a user to select turning the device off, or changing a volume level for sounds emitted from the device, or non-interactive presentations showing current battery life, or received signal strength, or some combination. After at least one connection to the boot server, the UI information data structure 211 holds data that indicates the positions and rendering styles for all interactive options and non-interactive presentations that were supported at the time of the last connection to the boot server. If one or more options, positions or rendering style has changed at the boot server 120 since that last connection, the data in the UI information data structure 211 will not reflect those changes.

The login UI data structure 213 holds data that indicates the instructions for the UI engine to prompt the user for, and receive, the user credentials used to authenticate the user, such as a user name and password. The credentials may be defined in any manner known in the art, such as the username and password or telephone number and personal identification number (PIN) established by the network operator for the UE 101, or the retail merchant from which the UE 101 was obtained, or the username and password for one of the subscription services, such as subscription service 110a. When first installed on the UE 101, the login UI data structure 213 holds a default login UI. For example, the default UI includes interactive options for a user to enter a telephone number and PIN. The credentials data structure 215 holds data that indicates the user response to the login UI. When first installed on the UE 101, the credentials data structure 215 is empty. After at least one response by the user, the credentials data structure 215 holds data that indicates the user's response, e.g., values for the telephone number and PIN, or username and password. After at least one connection to the boot server, the login UI data structure 213 holds data that indicates the positions and rendering styles for all interactive options for entering user credentials.

The cache data structure 217 holds data that indicates the network address of the boot server 120. In some embodiments, the network addresses of the boot server 120 is fixed by the software and not changed. In some embodiments, the network addresses of the boot server 120 may be updated by the boot server 120 to take effect at some future time, and the cache 217 holds data that indicates the start date for an associated boot server network address.

Other information obtained from the boot server is also stored in the cache data structure 217. For example, in some embodiments, the cache data structure 217 holds data that indicates an advertisement to display on the UE while the top level UI is being assembled.

The download manager 220 downloads software and data for the top level user interface from one or more different network devices, either directly, such as with the boot server 120, or indirectly through the browser 107, such as with one or more network services 110. In the illustrated embodiment, the download manager 220 caches information in one or more data structures, including a core application universal resource locator (URL) data structure 211, a data cache data structure 223, a user state data structure 225 and an application states data structure 227.

The core application (app) URLs data structure 221 holds data indicating the network addresses (such as URLs) for zero or more core applications. Core applications are applications available from a network service 110 and considered important for the basic operation of the device, such as a telephone dialer, contact list manager, and a ring tone manager on a cellular telephone. In some embodiments, the network addresses of the core applications are fixed by the software and not changed. In some embodiments, the network addresses of the core applications may be updated by the boot server 120.

The cache data structure 225 holds other information related to downloading software and data from the network. For example, in some embodiments, the cache data structure 223 holds data indicating whether to render one or more applications, such as one or more core applications, in the browser 107 or through the UI engine with instructions stored in the cache data structure 223.

The user state data structure 225 holds data that indicates the user state, such as applications installed by the user on a user device (either UE 101 or some other device owned by the same user). For example, user-selected applications may include a sports team score update application or stock market price application or both. In some embodiments, the user state data structure 225 also holds data that indicates the context of the user, such as the user's current geographic location, the user's home geographic location, the user's age, the user's social network service and social network contacts, the user's history or statistics for running one or more applications. In some embodiments, the user state data structure 225 holds data that indicates any applications (either core applications or user-selected applications or some combination) that were executing when, or just before, the user-selected a top level user interface option to turn off the user device, either UE 101 or some other device owned by the same user.

When first installed on the UE 101, the user state data structure 225 is empty. After at least one connection to the boot server, the user state data structure 225 holds data that indicates the user state information when a user device (either UE 101 or some other device owned by the same user) last connected to the boot server 120, if ever. In some embodiments, the contents of the user state data structure are updated by the local device controller 201 on the UE 101. In some embodiments, some or all of the data in the user state data structure 225 is reported to the boot server 120 in one or more messages, either periodically or upon the user selection of the top level user interface option to turn off the device.

The application states data structure 227 holds data that indicates the state of any executing application indicated in the user state data structure 225. For example, if the user state data structure 225 holds data that indicates sports Team A score update application was executing, then the particular view of the application when, or just before, the device was shut down, along with the contents in the particular view at that time, are indicated by data in the application states data structure 227. In some embodiments, the application states are recorded by a corresponding network service 110, e.g., applications store their state to a server using HTML5 mechanisms; and, application states data structure 227 is omitted.

FIGS. 3A-3D are diagrams of graphical user interfaces utilized in the boot client process, according to various embodiments. As stated above, although a graphical user interface is depicted for purposes of illustration, in other embodiments all or part of the top level user interface is audio, tactile, chemical or some other phenomenon for interacting with a human being. The graphical user interfaces depict what is presented on a display screen, such as a touch screen, included within the UE 101.

It is assumed for purposes of illustration that the user network device, e.g., UE 101, includes a separate physical key (not shown) for turning the device on or off. After turning on, the device presents, on the display, data indicating that the device is starting up. If any data is in the cache data structure 217 for initial display, such as an advertisement, that data is also displayed.

In the illustrated embodiment, the top level user interface is incrementally displayed. When completed, the top level user interface includes one or more active areas that can be selected by a user to cause the device to perform some function and one or more graphic areas to display status information, such as signal strength and battery life. An active area is selected by a user, e.g., by touching a touch screen inside the area or using a pointing device to position a cursor over the area, as are well known in the art. In some embodiments, the top level user interface includes an active area for shutting down the network device. Thus, the top level user interface includes one or more elements configured to detect user input and in response perform a corresponding function. In various embodiments, the function is selected from a group comprising powering off, determining optional settings, accessing one or more tools that each represent a built in application, listing installed applications, display currently executing applications, expanding a current rendering, contracting a current rendering, among others, alone or in any combination, including all functions in the group.

Figure 3A:
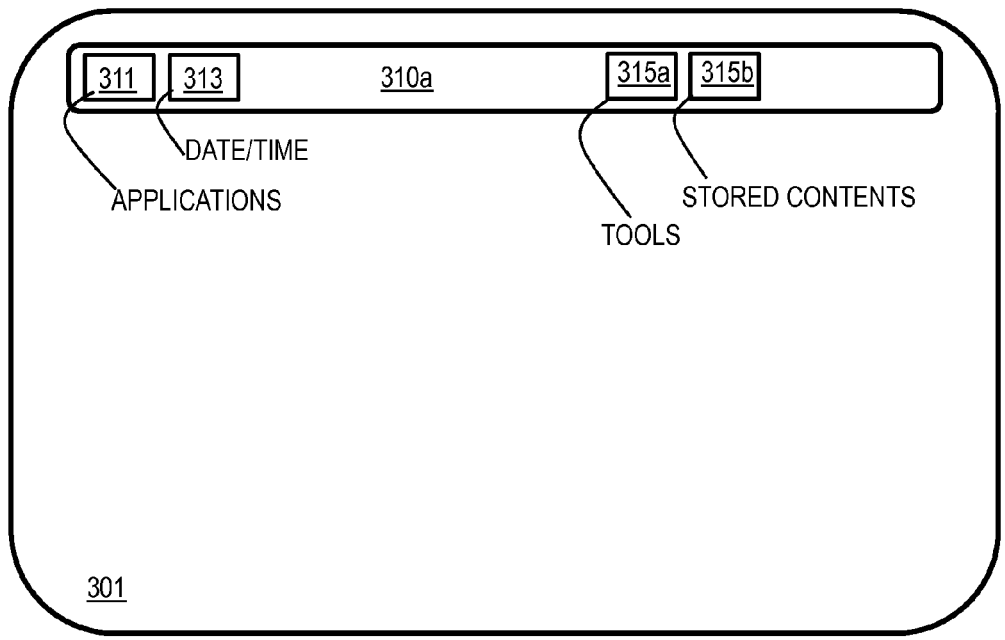
FIGS. 3A-3D are diagrams of user interfaces utilized in the boot client process, according to various embodiments.

For example, at some early time after start up, a GUI is displayed with a portion of the top level user interface. FIG. 3A is a diagram of graphical user interface 301 that includes an early portion 310a of a graphical top level user interface. While portion 310a in FIG. 3A and increasingly greater portions 310b, 310c and 310d depicted in FIG. 3B, FIG. 3C, FIG. 3D, respectively, show example portions of the top level graphical user interface, the various portions, including the full top level graphical user interface, are collectively referenced hereinafter as the top level graphical user interface 310.

For purposes of illustration, the portion 310a of top level graphical user interface 310 includes an applications active area 311, a date/time active area 313, a tools active area, and a stored contents active area. In other embodiments, more, fewer or different active areas are included in an early portion of the top level user interface 310. The applications active area 311 is selected to list the applications that can be executed on the device, e.g., on UE 101. The date/time active area 313 is selected to show or change the current date and time for the device, e.g., UE 101. The tools active area 315a is selected to show a list of tools that can be executed to control the device, such as a tool to change device settings such as picture brightness, text size, speaker volume, a tool to provide an alarm clock, a tool to provide a camera, etc. The stored contents active area 315b is selected to list the contents stored on the device, such as music files, picture files and video files, and application specific files, such as game files.

In some embodiments, any of the active areas displayed may be selected by the user. So, in such embodiments, the user can select the tools active area 315a to set a current time or alarm clock. Thus, the illustrated embodiment includes rendering a portion of the top level user interface incrementally as information for the top level user interface becomes available; and responding to user input detected for the rendered portion of the top level interface. An advantage of displaying the top level user interface incrementally is to make as much capability available as soon as possible, thus reducing wasted computational time on the user network device until the proper function is available for executing. Allowing a user to select an active area on an incrementally presented top level user interface is an example means to achieve this advantage.

Figure 3B:
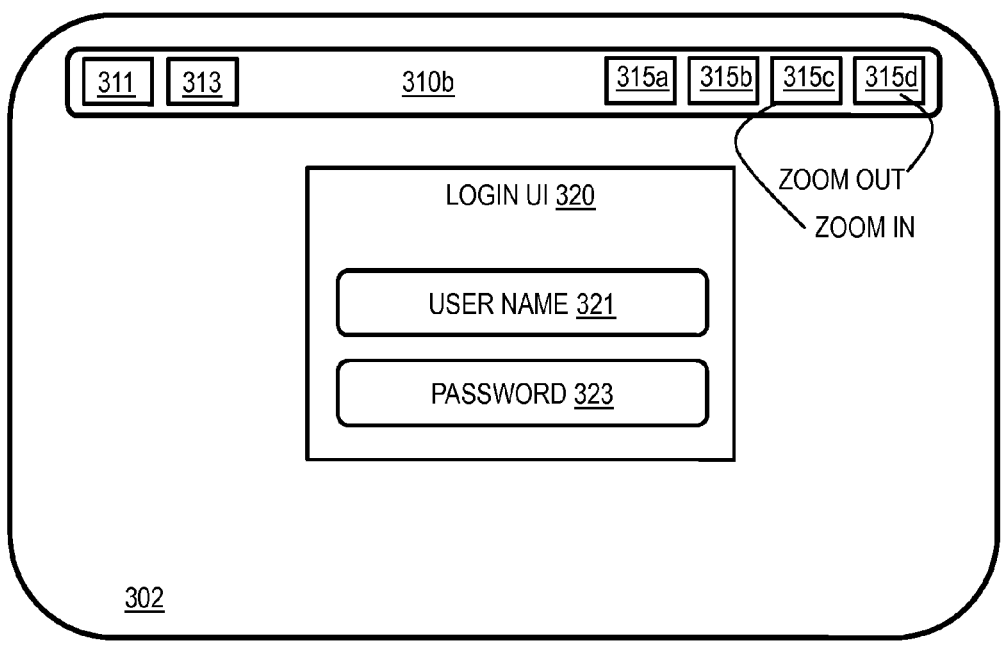

FIG. 3B is a diagram of graphical user interface 302 that includes a later portion 310b of a graphical top level user interface 310. The portion 310b of the top level user interface 310 includes additional active areas 315c and 315d. For purposes of illustration, active area 315c is selected to zoom in on (enlarge) anything displayed in the GUI 302; while active area 315d is selected to zoom back out (shrink).

The GUI 302 includes a login user interface (UI) 320 to prompt a user of the device for credentials. In the illustrated embodiment, the login UI 320 includes a user name active area 321 and a password active area 323. The username active area 321 is where the user is prompted to enter text indicating the user's name for tailored configuration of the device. The password active area 321 is where the user is prompted to enter text indicating the user's password so the user can be authenticated, as is well known in the art. In other embodiments, other user credentials are prompted for and determined in login UI 320, such as telephone number and PIN. In some embodiments, the user credentials are cached after being entered into login UI 320, so a subsequent start up of the device does not involve presenting the login UI 320. Thus, such embodiments include determining whether user credentials are cached on the device; and if user credentials are not cached on the device, then rendering a login user interface (e.g., login UI 320) to enter user credentials. An advantage of presenting the login UI 320 before completing the top level user interface 310 is to make good use of the user's availability while the top level user interface is being dynamically generated and presented. This also reduces wasted computational time on the user network device waiting for the user to enter credentials after all the capability of the top level user interface, including launching user-selected applications, is already available for executing. Presenting the login UI before completing the presentation of the top level UI is an example means to achieve this advantage.

Figure 3C:
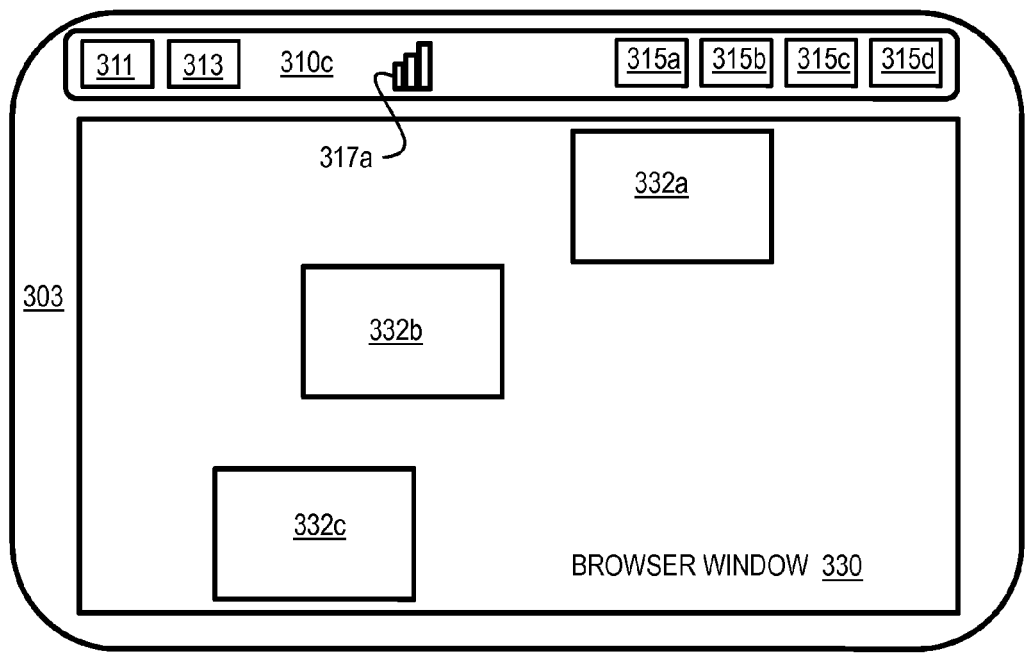

FIG. 3C is a diagram of graphical user interface 303 that includes a later portion 310c of a graphical top level user interface 310. In portion 310c, a graphical element 317a is added to indicate the signal strength detected by the network device. In some embodiments, the graphical element 317a is an active area that, when selected by a user, causes data to be presented that indicates one or more wireless communications links detected by the network device.

The GUI 303 includes a browser window 330 to present applications for executing on the user network device, e.g., UE 101. In the illustrated embodiment, the browser window 330 automatically presents active areas representing applications that have been launched automatically, such as one or more core applications or one or more user-selected applications that were executing on this user network device or another user network device owned by the same user, or some combination. For example, it is assumed for purposes of illustration that active areas 332a, 332b and 332c (collectively referenced hereinafter as executing applications areas 332) are presented representing two core applications and one user-selected application, respectively. To further illustrate the GUI 303, it is assumed that active area 332a shows an image indicating a contacts list and responds to user activation by opening a contacts list manager window controlled by such an application, in that application's last state on any device owned by the user. Similarly, it is assumed that active area 332b shows an image indicating ring tones and responds to user activation by opening a ring tones manager window controlled by such an application, in that application's last state. Similarly, it is assumed that active area 332b shows an image indicating sports Team A and responds to user activation by opening a sports Team A score update window controlled by such an application, in that application's last state. Thus, the illustrated embodiment includes causing a particular executing application to be launched in the last state of the particular application.

An advantage of using a browser window to display the active areas 322 is that the window contents are easily generated with HTML commands that associate links to other network resources with graphical elements such as 332, as is well known in the art. Browser window 330 is an example means of achieving this advantage. In some embodiments, the listing and launch of applications in a browser is implemented in HTML with JavaScript and Cascading Style Sheets (HTML/JS/CSS). Thus, in some embodiments, the device (e.g., UE 101) includes a World Wide Web browser (e.g., browser 107); and the top level user interface includes a window (e.g., window 330) for the browser. In GUI 303, the window 330 for the browser includes an area 332 that indicates a particular application, wherein the particular application is currently executing. In other embodiments, other windows or user interfaces are opened to present applications for executing on the device, including currently executing applications.

An advantage of automatically launching an application in its last state on any device owned by the user is to allow the user to go seamlessly from one device, such as a laptop computer, to another, such as a cellular telephone. The saves computational resources and time on the second user network device (e.g., UE 101) launching and inputting data to return to a previous state of an executing application. Executing applications areas 332 are an example means of achieving this advantage.

In some embodiments, the browser window 330 includes other user state information (not shown), such as the current geographic location (position, municipality or country, or some combination) of UE 101, or the user's contacts who are currently connected to the communications network 105, or other devices owned by the same user, or some combination. An advantage of presenting other user state information is to allow the user to identify when user state information should be changed or augmented. This provides the advantage of causing the active areas 332 to be more likely used, thus avoiding wasting user network device resources and network bandwidth receiving, decoding and rendering application areas for applications that are not relevant to the user's actual context or state. Presenting other user state information is an example means of achieving this advantage.

Figure 3D:
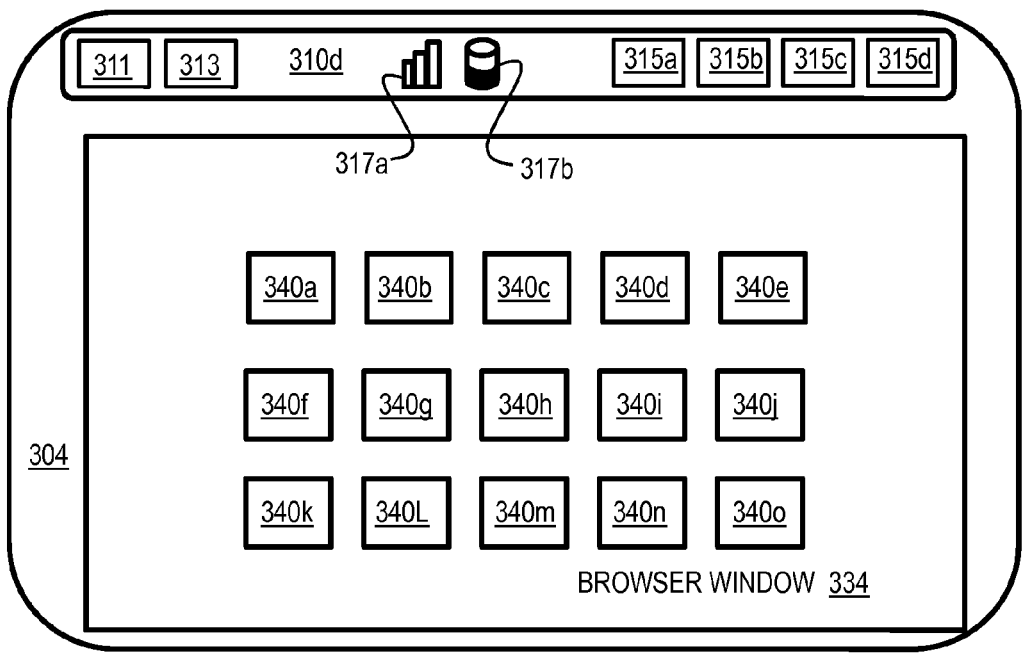

FIG. 3D is a diagram of graphical user interface 304 that includes a later portion 310d of a graphical top level user interface 310. In portion 310d, a graphical element 317b is added to indicate the battery life remaining for the network device. In some embodiments, the graphical element 317b is an active area that, when selected by a user, causes data to be presented that indicates time left at the current rate of power consumption.

The GUI 304 includes a browser window 334 to present applications for executing on the user network device, e.g., UE 101. In the illustrated embodiment, it is assumed for purposes of illustration, that the user has selected the active area 311 to list the available applications (including both core applications and any user-selected applications). For example, it is assumed for purposes of illustration that active areas 340a through 340o (collectively referenced hereinafter as available applications areas 340) are presented representing all available applications. When a user selects an available application area 340, the link is followed to a page that automatically launches the application. Thus, the window 330 for the browser 107 includes a link 340 for launching an application from the browser 107.

An advantage of using a browser window 334 to display the active areas 340 is that the window contents are easily generated with HTML commands that associate links (e.g., URLs) to other network resources with graphical elements such as 340, as described above. Browser window 334 is an example means of achieving this advantage. In other embodiments, other windows or user interfaces are opened to present applications available for executing on the device.

In some embodiments, active areas 340 include only active areas for applications suitable to the user's context. For example, applications not licensed in the current geographic area of the UE 101, as determined by the global position of UE 101, or for the current date, are not included among the applications represented by active areas 340. An advantage of omitting one or more active areas 340 for applications that are not suitable for the user's context is to save computational resources on the user network device (e.g., UE 101) receiving and rendering active areas 340 that cannot be successfully executed. Presenting only suitable active areas 340 is an example means to achieve this advantage.

Figure 5:
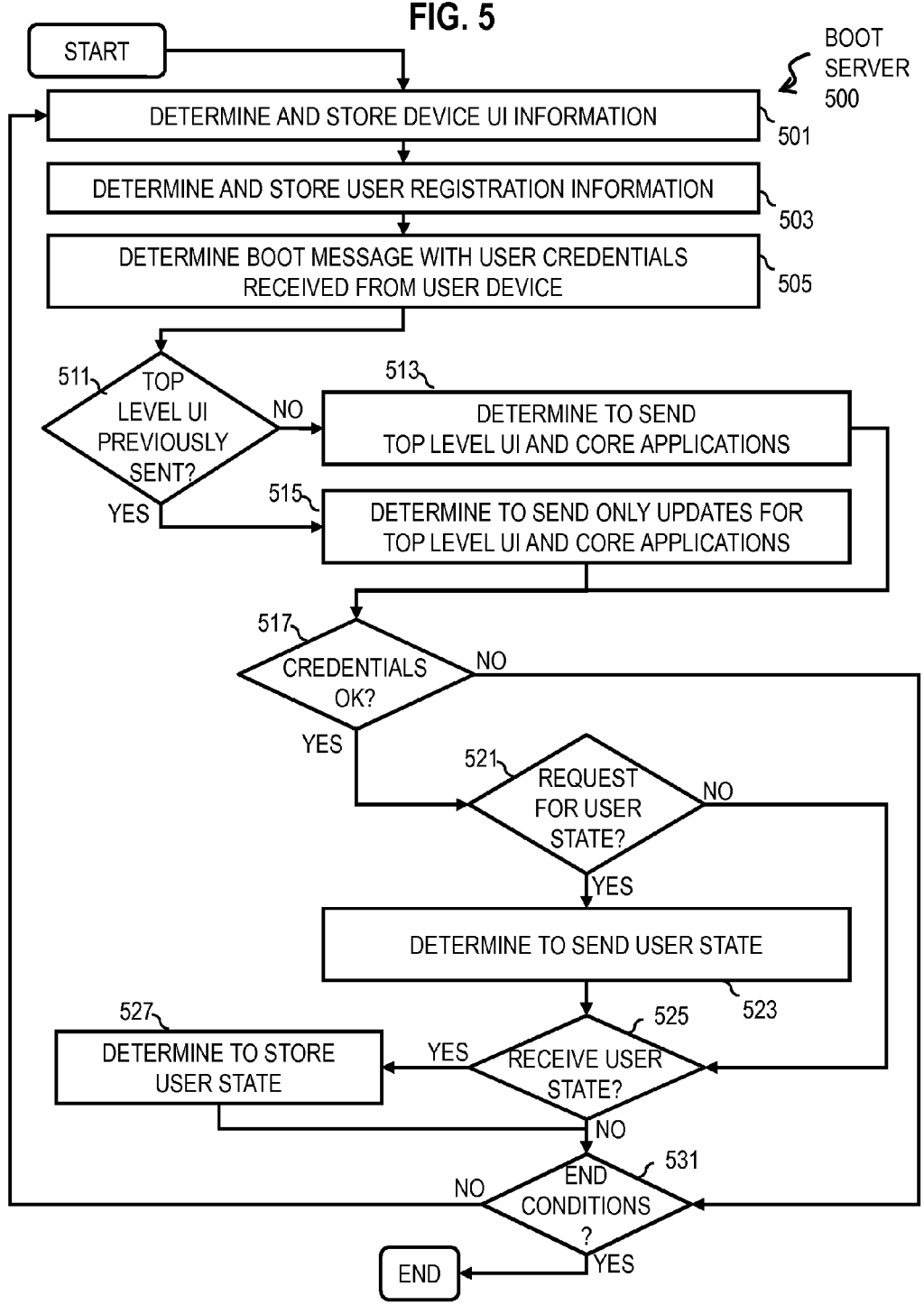
FIG. 5 is a flowchart of a boot server process for automatic dynamic network device start-up, according to one embodiment.
Figure 10:
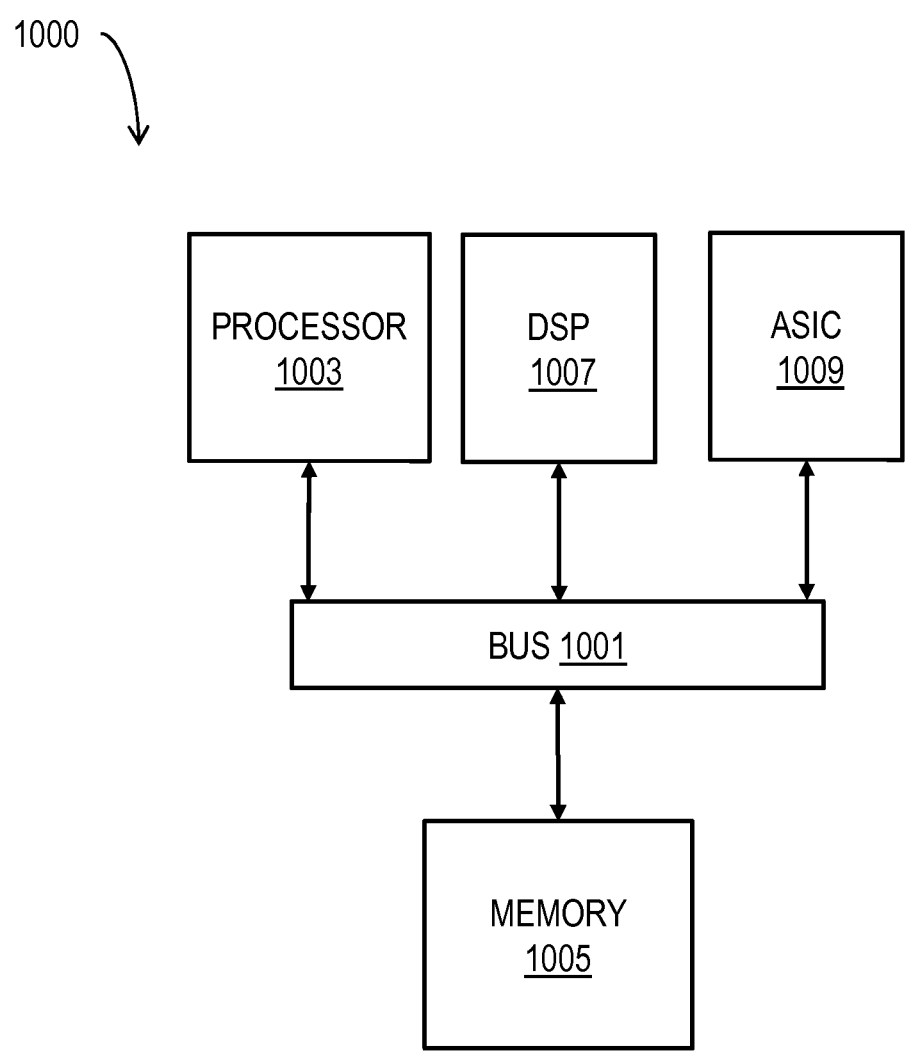
FIG. 10 is a diagram of a chip set that can be used to implement an embodiment of the invention.

FIG. 4 is a flowchart of a boot client process 400 for automatic dynamic network device start-up, according to one embodiment. In one embodiment, the boot client 122, such as one or more components of boot client 200, performs the process 400 and is implemented in, for instance, a chip set including a processor and a memory as shown in FIG. 10. Although the method of FIG. 4 and subsequent flowchart FIG. 5 are shown as integral steps in a particular order for purposes of illustration, in other embodiments, one or more steps, or a portion thereof, are performed in a different order, or overlapping in time, in series or parallel, or are omitted, or one or more additional steps are added, or the method is changed in some combination of ways.

In step 401, upon start up, an initial presentation is displayed on the UE 101. For example the local device controller 201 of boot client 200 presents a default screen indicating the device (e.g., UE 101) is starting up. Any method may be used to determine the initial presentation to be displayed. In various embodiments, the initial presentation is included as default values within computer instructions that implement at least a part of the boot client, or from a local data structure such as a database, or is received in one or more messages through a communications network, such as network 105, from another network device, either in response to a query message or unsolicited, or the data is determined in some combination of ways. In some embodiments, step 401 includes determining whether the cache 217 includes data indicating an initial presentation previously downloaded from the boot server 120, such as an advertisement screen or video or audio clip. If so, then step 401 includes displaying the initial presentation retrieved from cache 217.

In step 403, the network address (such as a URL) of the boot server 120 is determined. In some embodiments, a network address (such as a URL) for one or more core applications is also determined during step 403. For example, the local device controller 201 of boot client 200 determines the network addresses for the boot server 120 and one or more core applications. Any method may be used to determine these addresses, as described above for the initial presentation. In some embodiments, during step 403, the local device controller 201 of boot client 200 determines whether the cache 217 includes data indicating the network addresses of the boot server 120 previously downloaded from the boot server 120. If so, then step 403 includes retrieving the network address of the boot server from cache 217. In some embodiments, during step 403, the local device controller 201 of boot client 200 determines whether the core applications data structure 221 includes data indicating the network addresses of one or more core applications previously downloaded from the boot server 120. If so, then step 403 includes retrieving the network address of the one or more core applications from core applications data structure 221.

In step 405, it is determined whether user credentials are stored in cache, e.g., in credentials data structure 215. For example, the local device controller 201 of boot client 200 determines whether the credentials data structure 215 is not empty. If so, then control passes to step 411 described below. If not, then in step 407 the user is prompted for credentials and the user responses are determined. For example, during step 407 the credentials UI 320 is presented, as described above with reference to FIG. 3B. In some embodiments the user responses are stored in credentials data structure 215 during step 407. Control then passes to step 411.

In step 411, it is determined whether the network is ready to carry messages back and forth to the user network device, e.g. UE 101. For example, the local device controller 201 of boot client 200 determines whether the acknowledgement messages are received from one or more network devices of the operator, such as operator gateway 130. If so, then control passes to step 431 and following, described below. If not, then the top level user interface is based on data already cached on the user network device, as shown in steps 413 through 425.

In step 413, it is determined if a top level user interface is cached, at least in part, on the user network device. For example, the local device controller 201 of boot client 200 determines whether there are user interface declarative statements in the UI information data structure 211. If not, then in step 415 a default top level user interface is rendered at the user network device. A default top level user interface is included in computer instructions for the boot client, such as a set of default UI engine declarations. For example, the local device controller 201 sends the default instructions to the UI engine. A default top level user interface includes a small or minimal set of active areas, such as an active area to shut down the user network device (e.g., UE 101) and an element (like graphical element 317b) to indicate battery life remaining.

If it is determined, in step 413, that the top level user interface is cached, at least in part, e.g., by virtue of a prior network communication with the boot server 120, then in step 417, the cached user interface is rendered on the user network device (e.g., on a display unit of UE 101). For example, the local device controller 201 sends instructions based on the contents of data structure 211 to the UI engine 103, such as sending declarative statements retrieved from data structure 211 to a declarative UI engine. The cached UI information produces the last top level UI provided by the boot server 120 to the user network device (e.g., UE 101); and does not reflect any subsequent changes in the top level user interface determined at boot server 120. Thus, if the communications network is not available, some embodiments include determining whether second data that describes at least a portion of the top level interface is cached on the device. If the second data is cached on the device, then step 415 or 417 includes rendering the top level user interface based on the second data.

In step 419 core applications are rendered. For example, the download manager 220 generates a web page with links to the core applications; and the web page is associated with an active area in the top level user interface, e.g., with active area 311. For example, a web page is generated with an active area 340 associated with URLs for each core application. The URLs for the core application are found in the computer code for the boot client 200, e.g., in the computer code for the download manager, or in core applications URLS data structure 221. The core applications URLS data structure 221 is capable of being updated in one or more prior connections to the boot server 120. Thus, some embodiments include determining one or more core applications; and, rendering in the top level interface a user interface component for launching the one or more core application.

In step 421, it is determined whether user state information is cached. For example, the download manager 220 of boot client 200 determines whether there is data in the user state data structure 225. If not, then no user state information is available; and control passes to step 425. If so, then in step 423 the user-selected applications are added to the applications web page (e.g., shown in window 330). If the data in the user state data structure indicates that any core applications or user-selected application was executing, then the browser 107 is launched in browser window 330, and the indicated applications are launched from there in active areas 332a, which are sized and positioned as when the user network device (e.g., UE 101) last started shutting down (or the boot server 120 last communicated the user state to the user network equipment, even from a different network device owned by the same user). The applications represented in active areas 322 are advanced to their last state as recorded by the corresponding network servers, e.g., using HTML5 mechanisms, well known in the art. In some embodiments, the applications represented in active areas 322 are advanced to their last state as recorded in the applications sates data structure 227 by the download manager 220 of the boot client 200. Thus, some embodiments include determining whether user state is cached on the device. If user state is cached on the device, then data that represents the user state is rendered in the top level user interface.

In step 425, the boot client 122 responds to user input to the top level user interface and browser windows 330 or 334, until the network becomes ready. For example, in response to the user selecting active area 311 in GUI 303 depicted in FIG. 3C, the browser window is linked to the web page generated of available core applications and user applications based on data cached in data structures 221 and 225, and displayed as browser window 334.

When the network is available, control passes to step 431. In step 431 the latest version of the top level user interface is downloaded from the boot server and cached. For example, the local device controller 201 sends a message to the download manager 220 to request the top level user interface (and in some embodiments, a new address for the boot server or one or more core applications, or some combination). The download manager 220 communicates with the boot server 120 in one or more messages and receives the top level user interface (or updates to a previously downloaded top level user interface). The received instructions for the top level user interface are sent to the top level user interface manager 210 which caches them in the UI information data structure 211. The top level user interface manager 210 also sends the instructions for the updated top level user interface to the UI engine 103. In some embodiments, these are declarative statements sent to a declarative UI engine. Thus, the device includes a declarative user interface engine and the first data from the boot server for at least a portion of the top level user interface comprises statements for a declarative user interface engine. An advantage of the declarative UI engine is that the declarative statements to generate a user interface are short and simple and save bandwidth on the communications network and processing time on both the boot server 120 and boot client 120 in sending and receiving the statements, respectively.

In some embodiments, an updated network address of the boot server for subsequent communications is also received, passed to the top level user interface manager 210 and stored, e.g., in UI information data structure 211. In some embodiments, an updated list of network addresses of one or more core applications are also received from the boot server 120 and stored by the download manager 220 in the core applications URLs data structure 221.

Thus during step 431, in response to receiving the first data for at least a portion of the top level user interface from the boot server, the first data is cached on the device (e.g., UE 101). In some embodiments, the first data includes an updated network address for the boot server. In some embodiments, the first data includes an updated list of network addresses for one or more core applications.

In step 433, the boot client 122 responds to user input. For example, the local device controller 201 performs the functions indicated by user responses to the top level user interface, such as to set an alarm clock. In some embodiments, step 433 is performed overlapping in time with step 431, so that the local device controller 201 responds to user selections of displayed active areas even before the top level user interface is completely presented.

In step 435 the latest version of the core applications are downloaded from the corresponding servers and cached and rendered in the top level user interface. For example, the download manager 220 instructs the browser 107 to download the scripts for the client side of the core applications and installs as links in web page (as depicted in browser window 334). The page is linked to an active area in the top level user interface, e.g., to active area 311. The core applications are thus rendered on a display of the user network device (e.g., UE 101) by the browser 107 in a browser window opened in the top level user interface 310 by the UI engine, e.g., according to instructions received from the top level UI manager 210. Thus, first data indicating at least a portion of the top level user interface from the first server further comprises core data that indicates one or more core applications. The method further comprises rendering in the top level interface a user interface component for launching the one or more core applications In step 437, the boot client 122 responds to user input. For example, the browser presents the page in window 334 in response to user selection of the active area 311 in the top level user interface portion 310c. In some embodiments, step 437 is performed overlapping in time with step 435, so that the boot client 200 responds to user selections of displayed active areas even before the top level user interface is completely presented.

In step 441 the latest version of the user state available at the core server 120 is downloaded from the boot server 120 and cached. User credentials (newly entered in step 407 or previously cached) are sent to the boot server to authorize the user state to be downloaded to the network device. For example, the download manager 220 downloads the user state from the boot server 120 and caches the user state in user state data structure 225. In various embodiments, the user state includes the user context, the URLs of user-selected applications, and the URLs of applications that were running when a device owned by the same user last reported those executing applications to the boot server 120. In some embodiments, step 441 includes rendering data that represents user context in or near the top level user interface. For example, the user's geographic location and social network friends online or nearby are indicated in the top level user interface or on the web page rendered as browser window 330. Thus, the first data indicating at least a portion of the top level user interface from the first server further comprises user state data that indicates user state when the device was last used. The method further comprises rendering data that represents the user state.

In step 443 the latest version of the user-selected applications are downloaded from the corresponding servers and cached and rendered in the top level user interface. For example, the download manager 220 instructs the browser 107 to download the scripts for the client side of the user-selected applications and installs as links in a web page (as depicted in browser window 334). Often, the links are to the location of the executable code for the application on the local user device (e.g., UE 101). The page is linked to an active area in the top level user interface, e.g., to active area 311. The core applications are thus rendered on a display of the user network device (e.g., UE 101) by the browser 107 in a browser window opened in the top level user interface 310 by the UI engine, e.g., according to instructions received from the top level UI manager 210. Thus, the user state indicates a user-selected application. The method further comprises rendering in the top level interface a user interface component for launching the user-selected applications.

In step 445, the boot client 122 responds to user input. For example, the browser presents the page in window 334 in response to user selection of the active area 311 in the top level user interface portion 310c. In some embodiments, step 445 is performed overlapping in time with step 443, so that the boot client 200 responds to user selections of displayed active areas even before the top level user interface and all installed and executed applications are completely presented.

In step 447, applications that were running ("in progress") when a device owned by the same user last reported those executing applications to the boot server 120 are launched and advanced to their latest states. For example, the in progress applications are determined from the user state and are launched from the browser. The latest states are downloaded from the corresponding servers, when that capability is available. The applications are then rendered in their latest states, e.g., as active areas 332 in browser window 330. In some embodiments, the application states are cached in the application states data structure 227. Thus, the user state indicates a particular application that had been executing for the user. The method thus further comprises determining the last state of the particular application from a corresponding server for the particular application. The method thus also comprises causing the particular application to be launched in the last state of the particular application.

In step 451, it is determined whether end conditions are satisfied, e.g., whether the user has selected the shut down option of the top level user interface. If not, then in step 453 the network device (e.g., UE 101) continues to respond to user selections in the top level user interface 310. For example, data returned from the top level user interface 310 is received at the top level UI manager 210 and data is passed to the local device controller 201 which causes the selected actions to be performed. In another example, a user select an application in the browser window, and the application is launched, which controls further interfaces in the browser window. In some embodiments, the user installs additional applications through one or more of the browser windows 330 and 334. When conditions are satisfied to end the process 400, the current state of the user is cached in the user state data structure 225 and sent to the boot server 120 to use when any network device owned by the same user starts up.

Figure 9:
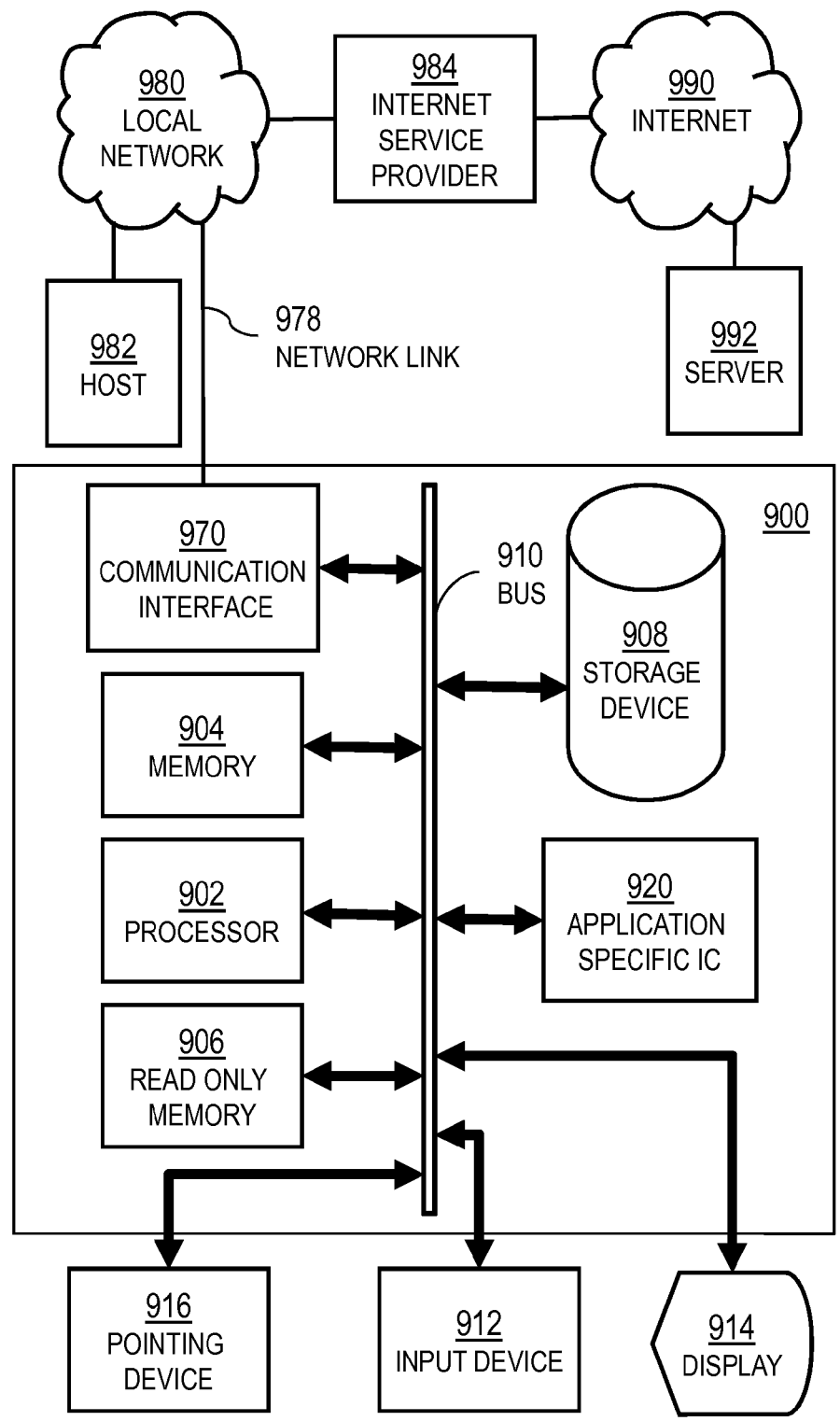
FIG. 9 is a diagram of hardware that can be used to implement an embodiment of the invention.

FIG. 5 is a flowchart of a boot server process 500 for automatic dynamic network device start-up, according to one embodiment. In one embodiment, the boot server 120 performs the process 500 and is implemented in, for instance, a chip set including a processor and a memory as shown in FIG. 10 or general purpose computer as shown in FIG. 9.

In step 501, user interface information for network devices are determined and stored. For example, the latest versions of top level user interface instructions that indicate for a UI engine the location, size, presentation style and valid ranges of input and output values are determined for each device and stored in device profile data structure 125. As models of network devices are added, new entries are determined and stored in the data structure 125. As the style, graphical elements, and inputs evolve for existing models, those revisions are stored in the device profile data structure 125. Thus step 501 includes determining first data that describes at least a portion of a top level user interface for a remote device, wherein the top level user interface is an interface for receiving input from a user of the remote device to operate the remote device.

In step 503, user information for users of network devices are determined and stored. For example, in some embodiments, the phone numbers, user names, and actual names and addresses of one or more customers in the customer accounts data structure 132 of the operator gateway are determined through API 134 and stored in the user profile data structure 123. In some embodiments, the username, email address, actual names and addresses and contacts (e.g., social network "friends") of one or more subscribers in the subscriber profiles data structure 112 are determined through API 114a and stored in the user profile data structure 123. In some embodiments, at least some such user information is obtained by a clerk at the point of sale and entered into the user profile data structure 123 by the point of sale service 140 through the boot server API 126. As users of network devices are added, new entries are determined and stored in the data structure 123.

In step 505 one or more messages are received from a boot client 122 on a network device (e.g., UE 101). In the illustrated embodiment, the messages include user credentials to identify and authenticate a particular user. Thus step 505 includes receiving a start-up message that indicates the remote device is being powered up.

In step 511, it is determined whether first data indicating UI engine instructions for the top level user interface have already been sent to this network device. Any method may be used to determine this. In some embodiments, the messages from the network device include the UE ID 103, and the user profile in data structure 123 includes a list of UE IDs associated with the user. If the UE ID is not in the user profile data structure, then it is determined that the top level user interface has not been previously sent to the network device. In some embodiments, the messages from the network device include the UE ID 103, and the device profile in data structure 123 includes a list of UE IDs associated with each device model. If the UE ID is not in the device profile data structure, then it is determined that the top level user interface has not been previously sent to the network device. In some embodiments, the message received indicates a latest version of the top level user interface cached on the device, and an update rather than a full download is explicitly requested.

If it is determined in step 511 that the top level user interface instructions have not previously been sent, then, in step 513, it is determined to send all the instructions for the portion of the top level user interface provided by the boot server. If it is determined in step 511 that the top level user interface instructions has previously been sent, then, in step 513, it is determined to send only the instructions for the modified sub portions of the portion of the top level user interface provided by the boot server. An advantage of sending only modified sub-portions is that bandwidth is saved on the communications network 105 between the boot client 122 and boot server 120. Steps 511, 513 and 515 are an example means to achieve this advantage. Thus step 513 or 515 includes, determining to send the first data to the remote device in response to receiving the start-up message. In step 515, the first data describes only the portion of the top level user interface that has changed since a last message received from the remote device.

In step 517, it is determined whether the user credentials are acceptable ("OK"). In some embodiments, the user credentials are included in the message received in step 505. In some embodiments, the user credentials are received in a separate message. Any method may be used to authenticate the user. In some embodiments, the credentials are sent to the network service from which the user identifier was obtained, e.g., to operator gateway 130 or subscription service 110, through API 134 or API 114a, respectively. The corresponding network service returns an authentication result message that indicates the credentials are accepted or rejected. In some embodiments, a separate authentication service (not shown) is used for that purposes. In some embodiments, the boot server 120 issues and maintains the credentials (e.g., username and password) and performs the authentication itself.

If the authentication fails, during step 517, then control passes to step 531. In step 531 it is determined whether end conditions are satisfied. For example, it is determined whether the boot server is to be changed to a different network device. If so, the process 500 ends. If not, control passes back to step 501 and following steps to update the device and user profiles and process additional boot requests.

If authentication succeeds, then in step 521 it is determined whether the message includes a request for user state. In some embodiments, any request that includes user credentials is considered a request also for user state. If so, then in step 523 it is determined to send user state based on the user profile data structure 123. Thus step 523 includes determining to send the locally stored user state data to the remote device in response to receiving the start-up message.

If not, then in step 535, it is determined whether the message indicates user state, e.g., in one or more messages sent by the boot client 122 during step 455, described above. If the user state is received, then in step 527 the user state is stored in the user profile data structure 123. Thus step 527 includes receiving from the remote device user state data and determining to store locally the user state data, wherein the user state data indicates one or more of a user-selected application on the remote device or a particular application that was executing on the remote device when the remote device was shutting down. Control then passes to step 531 to determine whether end conditions are satisfied, as described above.

In some embodiments, user state is not sent by the boot server 120; and credentials are not included in the messages received in step 505; and steps 517 through 527 are omitted.

Figure 6:
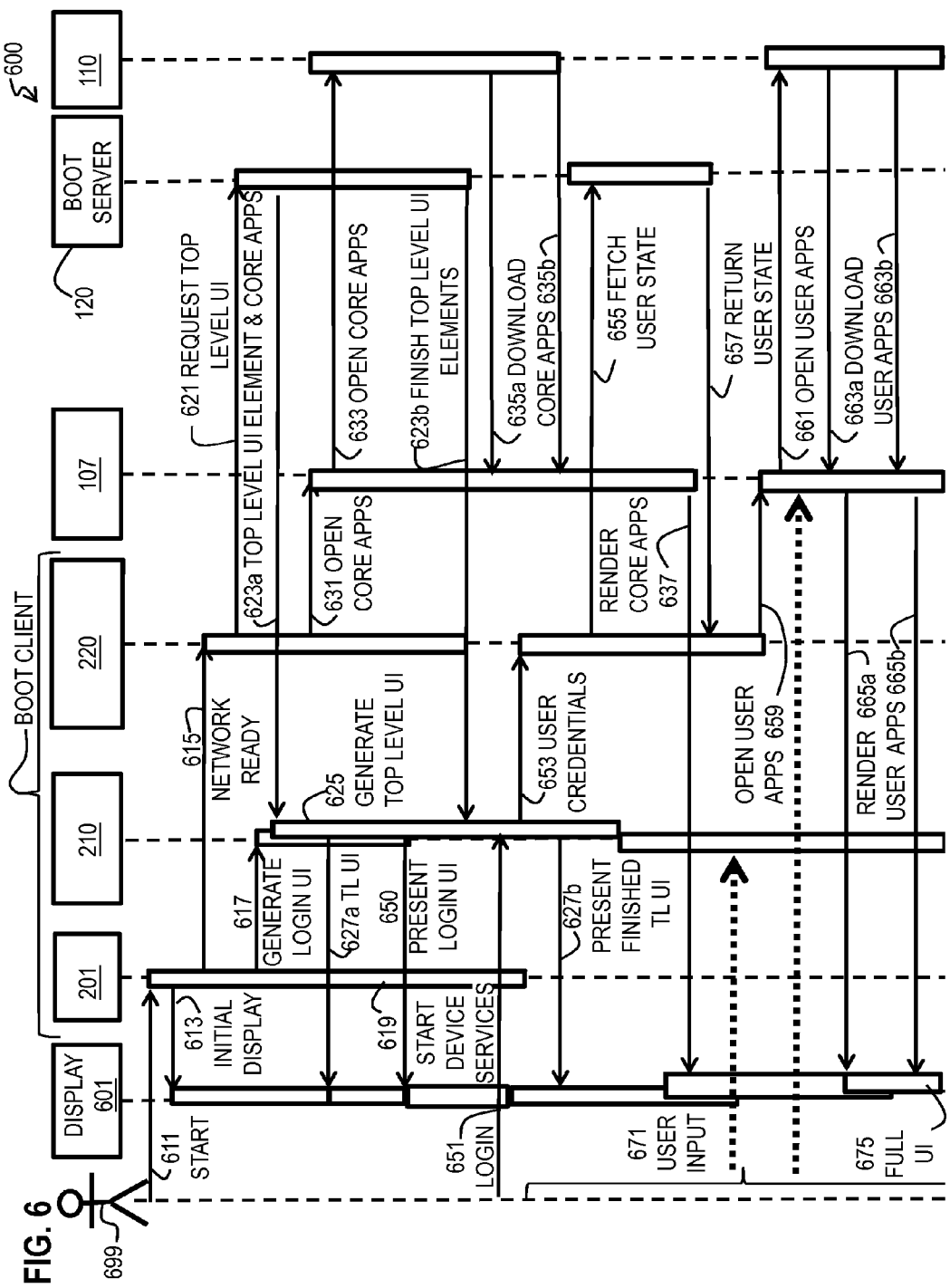
FIG. 6 is a time-sequence diagram of an initial automatic dynamic network device start-up, according to one embodiment.

FIG. 6 is a time-sequence diagram 600 of an initial automatic dynamic network device start-up, according to one embodiment. In FIG. 6 and following time sequence diagrams FIG. 7 and FIG. 8, time increases downward, an individual network process is represented by vertically aligned, vertically elongated boxes connected by dashed lines and labeled by rectangles at the top. A message sent from one process to another is indicated by a horizontal arrow pointing from the sending process to the receiving process. The processes represented in FIG. 6 include a display unit 601, the local device controller 201 and top level user interface (TL UI) manager 210 and download manager 220 of the boot client 200, and the browser 107, all on the user's network device (such as UE 101). Also included are the boot server 120 and one or more application services 110. Also represented in diagram 600 is a user 699 who interacts with the user network device (e.g., UE 101) by turning the device on and operating elements of the top level user interface. The diagram 600 indicates example process interactions when the device is first operated by a user and a communications network 105 is available.

Message 611 represents the user pressing the power switch on the user's network device to start the device. In response, the local device controller 201 begins operating. During step 401 described above, the controller 201 sends to the display unit 601 an initial presentation 613 that indicates the device is starting up. As described above, the initial presentation is a presentation fixed in the computer instructions or a dynamic presentation retrieved from the cache 217, such as an advertisement.

Because the network is available in this example, the controller 201 determines that the network is available and sends a network ready message 615 to the download manager 220. In some embodiments, the network ready message 615 also indicates the network address of the boot server and the URLs of the core applications fixed in the software instructions of the local device controller. In some embodiments, the URL of the boot server 120 is retrieved from the UI information data structure 211 and sent to the download manager in message 615. In some embodiments, the URL of the core applications are retrieved from the core applications URLs data structure 221 and sent to the download manager in message 615. In some embodiments, the download manager 220 retrieves the URL of the boot server or the URLS of the core applications, or both, and that information is not in the network ready message 615.

In response, the download manager 220 sends a request message 621 to the boot server 120 for the top level user interface instructions that will be passed to the UI engine 103 on the user's network device (e.g., UE 101). In response, the boot server 120 sends a response message 623a with UI engine instructions. Because diagram 600 applies to the first boot up by the device, there were no previous messages, and updates are not sent. Instead UI engine instructions are sent for the entire portion of the top level user interface provided by the server over multiple messages starting from message 623a and ending with message 623b. The download manager directs the response messages 623a through 623b to the TL UI manager 210. In response, the TL UI manager 210, during process 625, sends the instructions to the UI engine, thus incrementally presenting elements of the TL UI 310 on the display, as represented by messages 627a through 627b. The device services associated with the TL UI are gradually started by the controller 201 during process 619.

Meanwhile, the controller 201 determines that user credentials are not cached in credentials data structure 215. Therefore, the controller sends message 617 to the top level UI manager 210. The message 617 indicates the login UI, e.g. login UI 320, should be generated and presented to the user. In response, the top level UI manager 210 retrieves the instructions for the login UI from the data structure 213 and sends those instructions to the UI engine 103, thus causing the login UI to be presented to the user in one or more messages 650. Messages 650 are depicted as occurring in time after the first elements of the TL UI in message 627a, but before the completion of the TL UI 310 with message 627b. In some embodiments, the presented elements of the TL UI are deactivated, and grayed out on a display screen, when the login UI 320 is presented. The user enters the user's credentials in the login messages 651 that are passed to the TL UI manager 210. The TL UI manager 210 caches those credentials in the credentials data structure 215 and closes the login UI 320.

Overlapping in time with one or more of the above processes, the download manager 220 starts the browser 107 to open one or more core applications in one or more messages 631 that indicate the core applications URLs. In response, the browser sends one or more messages 633 to the services 110 at the corresponding URLs to download the latest versions of the requested core applications. In message 635a through 635b, the corresponding network services 110 download the latest versions of the client side of the core applications into the browser 107. Active areas representing the core applications are rendered in the browser 107, e.g., using graphical thumbnail or full sized icons downloaded from the services 110, and presented on the display in one or more messages 637. In some embodiments, the active areas representing the core applications are entered into a web page, such as in window 334, but not presented on the display unless and until the user selects a TL UI element associated with that page, such as active area 311. Such user input is indicated by dotted arrows from the interval 671 of user input. Thus when the user selects active area 311 on the TL UI 310, the browser window 334 is depicted, rendering active areas for each core application.

Meanwhile, in messages 653, the user credentials are passed from the TL UI manager 210 to the download manager 220. In messages 655 the user credentials are passed from the download manager 220 to the boot server 120 as a request to fetch the user state. (In some embodiments, the credentials are included in the request messages 621). In response, the boot server 120 returns to the download manager, messages 657 with data indicating the user state, including the user context, user contacts, URLs for user-selected applications, and any applications in progress on any user device that last reported to the boot server 120, including a different device owned by the same user.

In one or more messages 659, the download manager 220 commands the browser 107 to open the user-selected applications as indicated by user-selected applications URLs. In response, the browser sends one or more messages 661 to the services 110 at the corresponding URLs to download the latest versions of the requested user-selected applications. In message 663a through 663b, the corresponding network services 110 download the latest versions of the client side of the user-selected applications into the browser 107. Active areas representing the user-selected applications are rendered in the browser 107, e.g., using graphical thumbnail or full sized icons downloaded from the services 110, and presented on the display in one or more messages 665a through 665b. In some embodiments, the active areas representing the user-selected applications are entered into a web page, such as in window 334, but not presented on the display unless and until the user selects a TL UI element associated with that page, such as active area 311. Such user input is indicated by dotted arrows from the interval 671 of user input. Thus when the user selects active area 311 on the TL UI 310, the browser window 334 is depicted, rendering active areas for each core application. The user selects the application and opens the application within browser 107.

After all the user-selected applications are included in the web page depicted in window 334, the display 610 depicts the full user interface for operating the device.

Figure 7:
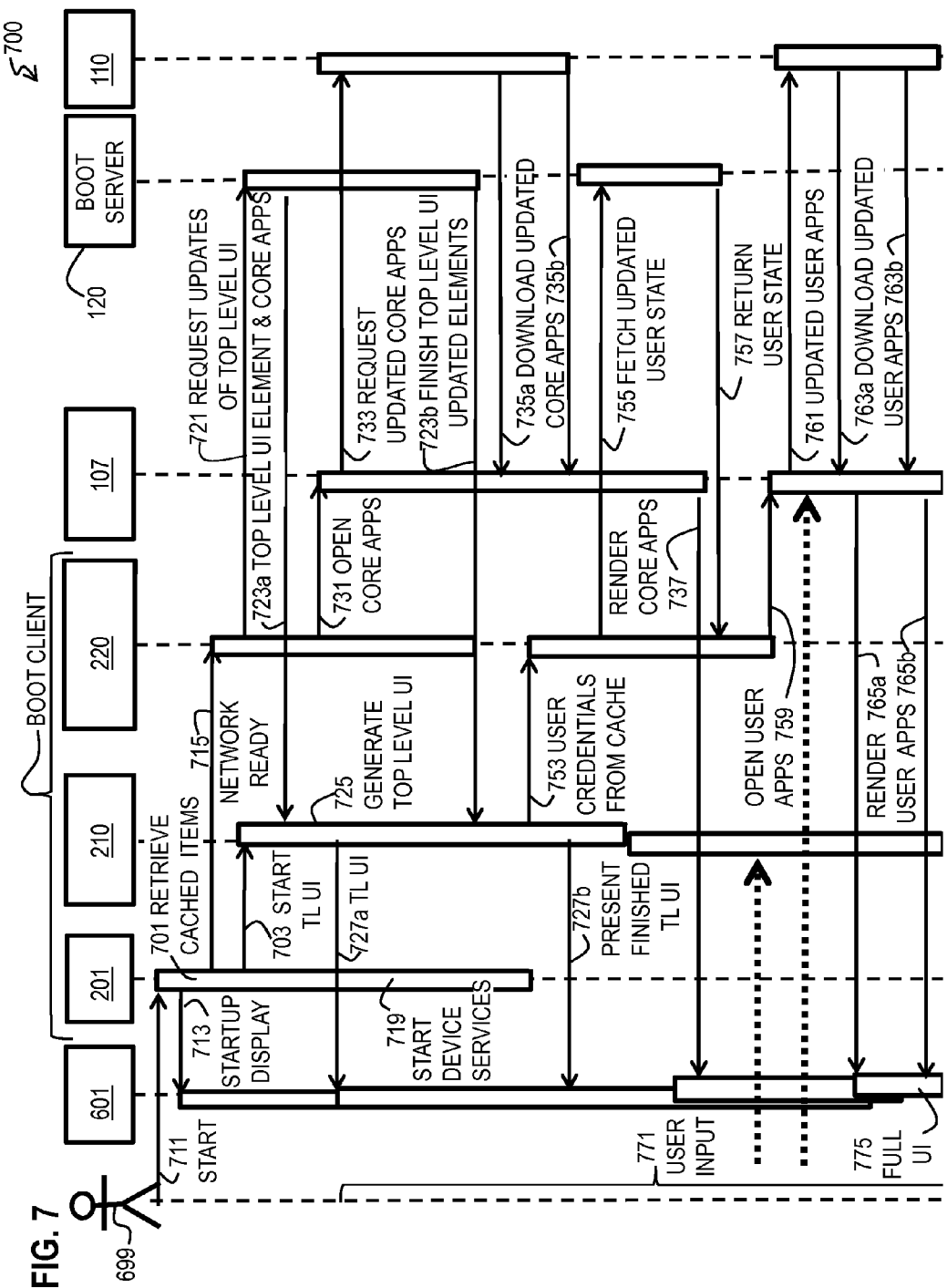
FIG. 7 is a time-sequence diagram of a subsequent automatic dynamic network device start-up, according to one embodiment.

FIG. 7 is a time-sequence diagram 700 of a subsequent automatic dynamic network device start-up, according to one embodiment. Diagram 700 is similar to diagram 600 but omits a login UI because the user credentials are already cached, and only receives updates to the TL UI 310 or core applications or user-selected applications. Only returning updates is an example means of achieving the advantage of reducing network bandwidth while providing automatic dynamic top level interfaces upon start up. The processes 601, 201, 210, 220, 107, 120, 110 and user 699 are as described above for FIG. 6.

After the start up represented by message 711, the local device controller 201 retrieves cached information, such as user credentials, boot server URL, core application URLs, and user-selected URLs, and applications in progress when shut down was initiated on the local device. The controller 201 also determines that the network is available; and sends the network ready message 715 to the download manager 220. The download manager 220 sends one or more messages 721 to request updates of the TL UI from the boot server and in responses 723a through 723b gets the updates.

Meanwhile the local device controller 201 commands the TL UI manager 210 to start presenting the TL UI based on the data cached in the UI information data structure 211. The TL UI manager 210 sends UI engine instructions based on the cached data to the UI engine for presentation on the display in one or more messages 727*a*. Based on the updates, the finished TL UI is presented in one or more messages 727*b*. User input is received throughout interval 771.

The download manager 220 launches the browser 107 to open the core applications. The browser requests update core applications in one or more messages 733 to the corresponding network services 110. Updated core applications, if any, are downloaded in messages 735*a* through 735*b* and rendered on the display unit 601 in one or more messages 737, e.g., in response to the user selecting active area 311.

The user credentials from cache are sent in one or more messages 753 from the controller 201 or TL UI manager 210 (as shown) to the download manager 220, which requests the boot server 120 to fetch updated user state (e.g., from a different network device of the same user) in one or more messages 755. An updated user state, if any, is returned in one or more messages 757. For example, the updated state shows different in progress applications from a different device by the same user.

Based on the returned user state, the download manager 220 commands the browser 107 to open the user-selected applications in one or more messages 759. In response, the browser 107 requests updated user-selected applications, if any, from the corresponding network services 110. The updated user-selected applications, if any, are returned in one or more messages 763*a* through 763*b* and rendered on the display unit 601, e.g., in window 334, using one or more messages 765*a* through 765*b*. The display unit presents the full user interface during process 775.

Figure 8:
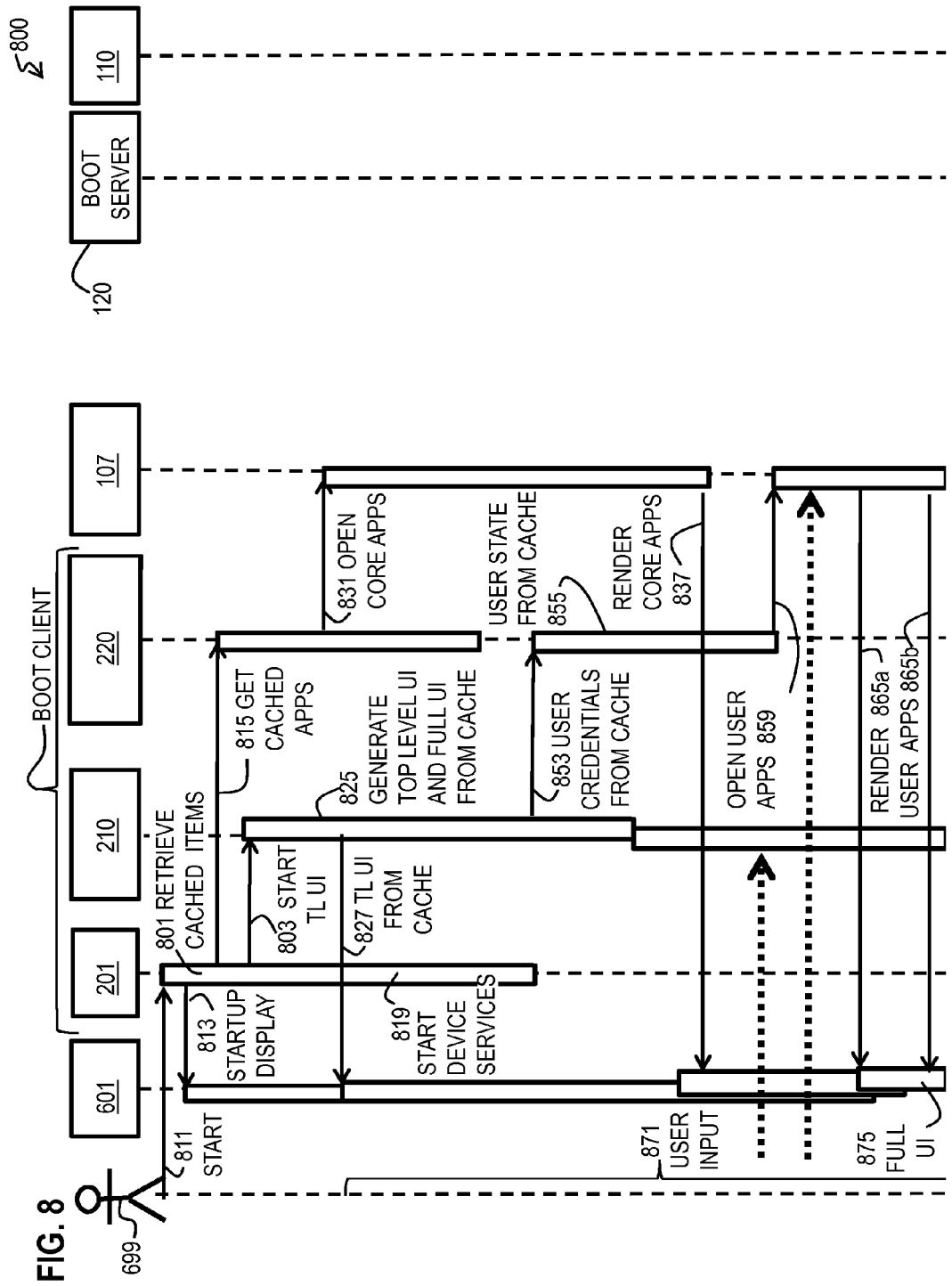
FIG. 8 is a time-sequence diagram of a subsequent automatic dynamic network device start-up without network availability, according to one embodiment.

FIG. 8 is a time-sequence diagram of a subsequent automatic dynamic network device start-up without network availability, according to one embodiment. This embodiment operates completely on cached information. The processes 601, 201, 210, 220, 107, 120, 110 and user 699 are as described above for FIG. 6.

After the start up represented by message 811, the local device controller 201 retrieves cached information, such as user credentials, boot server URL, core application URLs, and user-selected URLs, and applications in progress when shut down was initiated on the local device. The controller 201 also determines that the network is not available; and does not send a network ready message to the download manager 220. Instead the local device controller 201 sends to the download manager 220 one or more messages 815 to get cached applications. Meanwhile the local device controller 201 commands the TL UI manager 210 to start presenting the TL UI based on the data cached in the UI information data structure 211. The TL UI manager 210 sends UI engine instructions based on the cached data to the UI engine for presentation on the display in one or more messages 727*a*. Based on the updates, the finished TL UI is presented in one or more messages 827. User input is received throughout interval 871.

The download manager 220 launches the browser 107 to open the core applications. The browser opens the core applications as currently installed on the device and renders them, e.g. in window 334, which is presented on the display unit 601 via one or more messages 837.

Based on the cached user credentials received in one or more messages 853 and the cached user state retrieved in process 855, the download manager 220 commands the browser 107 to open the user-selected applications in one or more messages 859. The browser opens the user-selected applications as currently installed on the device and renders them, e.g. in window 334, which is presented on the display unit 601 via one or more messages 865*a* through 865*b*. The display unit 601 presents the full user interface during process 875.

The processes described herein for providing automatic dynamic network device start-up may be advantageously implemented via software, hardware, firmware or a combination of software and/or firmware and/or hardware. For example, the processes described herein may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) for automatic dynamic network device start-up as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of automatic dynamic network device start-up.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to automatic dynamic network device start-up. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for automatic dynamic network device start-up. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for automatic dynamic network device start-up, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display device 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for automatic dynamic network device start-up of the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display screen as display device 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed for automatic dynamic network device start-up as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of automatic dynamic network device start-up.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein for automatic dynamic network device start-up. The memory 1005 also stores the data associated with or generated by the execution of the inventive steps.

Figure 11:
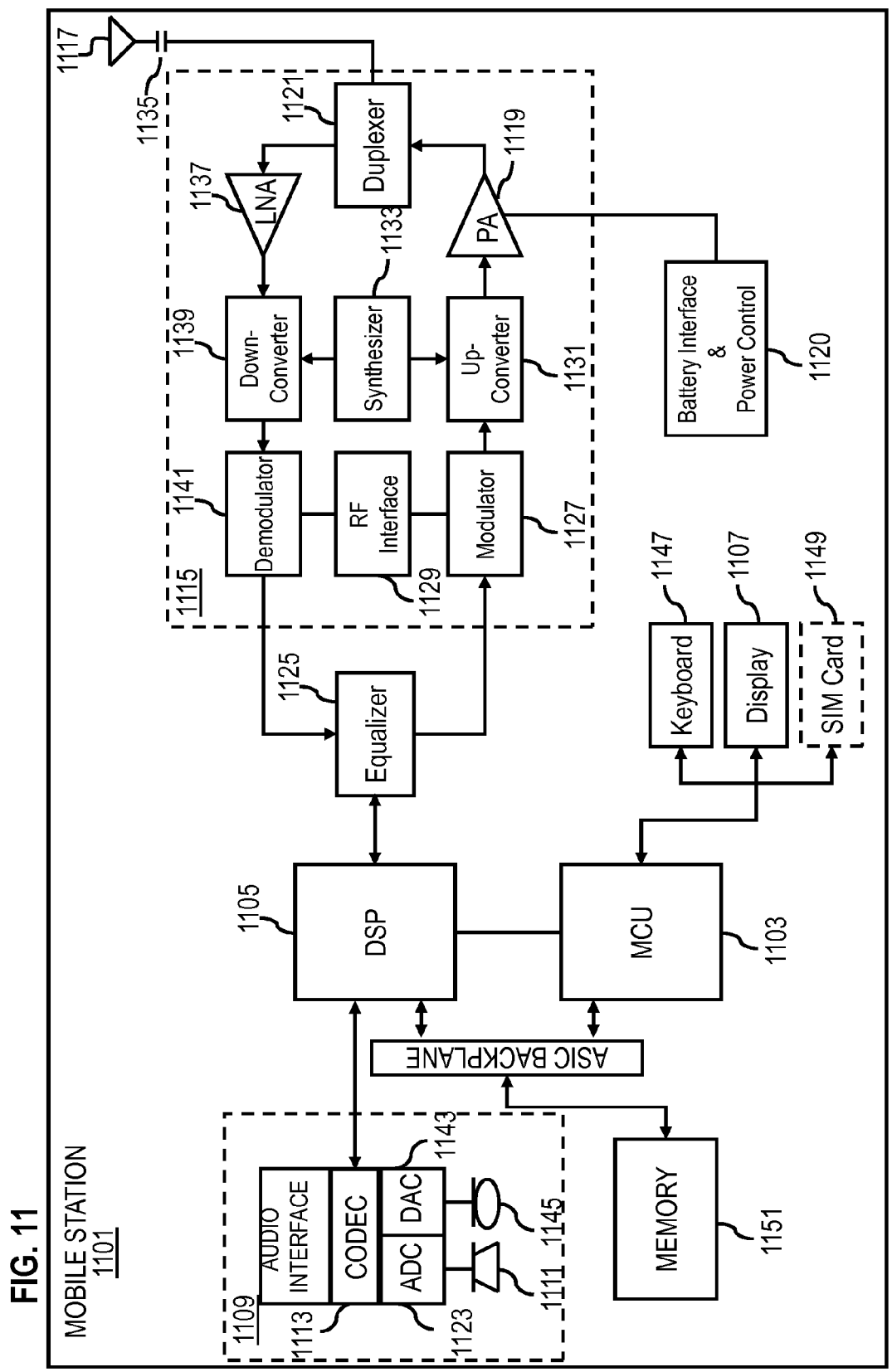
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of automatic dynamic network device start-up. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display device, such as a screen, to the user in support of various applications and mobile terminal functions that perform or support the steps of automatic dynamic network device start-up. The display unit 1107 includes display circuitry configured to display at least a portion of a user interface of the mobile terminal (e.g., mobile telephone). Additionally, the display unit 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for automatic dynamic network device start-up. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   in response to powering on a device, causing the device to perform at least:
      determining a server, wherein the server provides at least a portion of a user interface for the device;
      determining whether a communications network is available;
      if the communications network is available, determining to send a request message to the server, wherein the request message indicates at least a request for at least first data describing at least the portion of the user interface;
      receiving from the server the at least first data describing the at least the portion of the user interface;
      determining respective one or more execution states of one or more user-selected applications last reported from the device to the server prior to powering on the device based on the at least first data received from the server, wherein the user-selected applications are selected via the device based on at least one of a user profile or on one or more applications executing on the device when the device last powered down;
      causing display of a plurality of representations, in a browser of the device, of the respective one or more user-selected applications;
      receiving an indication of a selection of one of the plurality of representations; and
      causing an advancing of the user-selected applications associated with the selected representation, to the respective one or more execution states based on the at least first data received from the server,
      wherein the user interface is an interface for receiving input to operate the device.

2. A method of claim 1, further comprising, in response to receiving one or more portions of the first data from the server, incrementally rendering one or more portions of the user interface as the one or more portions of the first data are received.

3. A method of claim 1, wherein:
   the user interface includes one or more elements configured to detect user input and in response perform a corresponding function; and
   the function is selected from a group comprising powering off, determining optional settings, accessing one or more tools that each represent a built in application, listing installed applications, display currently executing applications, expanding a current rendering, contracting a current rendering.

4. A method of claim 1, wherein:
   the device includes a declarative user interface engine; and
   the first data comprises statements for the declarative user interface engine.

5. A method of claim 1, wherein:
   the device includes a world wide web browser; and
   the user interface includes a window for the browser.

6. A method of claim 5, wherein the window for the browser includes an area that indicates a particular application, wherein the particular application is currently executing.

7. A method of claim 1, wherein the device is a first device, and the method further comprises determining additional execution states of the one or more user-selected applications last reported to the server from a second device, different from the first device and different from the server.

8. A method of claim 1, further comprising, in response to powering on the network device:
   determining whether user credentials are cached on the device; and
   if user credentials are not cached on the device, then rendering a login user interface to enter user credentials.

9. A method of claim 1, further comprising, in response to powering on the network device, if the communications network is not available, then:
   determining whether second data that describes at least a portion of the user interface is cached on the device; and
   if the second data is cached on the device, then rendering the user interface based on the second data.

10. A method of claim 1, further comprising:
    rendering a portion of the user interface incrementally as information for the user interface becomes available; and
    responding to user input detected for the rendered portion of the interface.

11. A method of claim 1, wherein the user interface is a top level user interface.

12. A method of claim 1, further comprising:
    after transmitting the request message to the server, determining to send one or more additional request messages to the server, wherein the one or more additional request messages indicate one or more requests for downloading latest versions of one or more user-selected applications.

13. A method comprising:
    receiving an indication of a remote device being powered on;
    in response to the indication of the remote device being powered on, determining first data that describes at least a portion of a user interface for the remote device, wherein the user interface is an interface for receiving input at the remote device to operate the remote device;

determining user state data that indicates respective one or more execution states of one or more user-selected applications last reported from the remote device prior to the remote device powering up, wherein the user-selected applications are selected via the remote device based on at least one of a user profile or based on one or more applications executing on the remote device when the device last powered down;

in response to receiving a start-up message, determining to send at least the first data to the remote device and the user state data, wherein the start-up message indicates the remote device is being powered up; and causing instructions to be transmitted to cause display of a plurality of selectable representations, in a browser on the remote device, of the respective one or more user-selected applications, wherein selection of one of the selectable representations causes advancement of the associated user-selected application to the respective one or more execution states.

14. A method of claim 13, wherein the first data describes only the portion of the user interface that has changed since a last message received from the remote device, the remote device is a first remote device, and the method further comprising determining additional execution states of the one or more user-selected applications last reported from a second remote device, different from the first remote device.

15. A method of claim 13, further comprising:
receiving from the remote device the user state data; and
determining to store the user state data locally.

16. An apparatus comprising:
at least one processor; and
at least one memory including computer program code for one or more programs,
the at least one memory and the computer program code configured to, with the at least one processor, cause the apparatus to perform at least the following in response to powering on the apparatus,
determine a server, wherein the server provides at least a portion of a user interface for the apparatus;
determine whether a communications network is available;
if the communications network is available, determine to send a request message to the server, wherein the request message indicates at least a request for at least first data describing at least the portion of the user interface;
receive from the server the at least first data describing the at least the portion of the user interface;
determine respective one or more execution states of one or more user-selected applications last reported from the apparatus to the server prior to powering on the apparatus based on the at least first data received from the server, wherein the user-selected applications are selected via the apparatus based on at least one of a user profile or based on one or more applications executing on the apparatus when the apparatus last powered down;
cause display of a plurality of representations, in a browser of the apparatus, of the respective one or more user-selected applications;

receive an indication of a selection of one of the plurality of representations; and
cause an advancing of the one or more user-selected applications associated with the selected representation to the respective one or more execution states based on the at least first data received from the server,
wherein the user interface is an interface for receiving input to operate the apparatus.

17. An apparatus of claim 16, further comprising, in response to receiving one or more portions of the first data from the server, incrementally render one or more portions of the user interface as the one or more portions of the first data are received.

18. An apparatus of claim 16, wherein the apparatus is a mobile phone, the apparatus is a first device, and the apparatus is further configured to determine additional execution states of the one or more user-selected applications last reported to the server from a second device, different from the first device and different from the server.

19. An apparatus comprising:
at least one processor; and
at least one memory including computer program code for one or more programs,
the at least one memory and the computer program code configured to, with the at least one processor, cause the apparatus to perform at least the following,
receive an indication of a remote device being powered on;
in response to the indication of the remote device being powered on, determine first data that describes at least a portion of a user interface for a remote device, wherein the user interface is an interface for receiving input at the remote device to operate the remote device;
determine user state data that indicates respective one or more execution states of the one or more user-selected applications last reported from the remote device as executing on the remote device prior to the remote device powering up, wherein the user-selected applications are selected via the remote device based on at least one of a user profile or on one or more applications executing on the device when the device last powered down;
in response to receiving a start-up message, determine to send at least the first data to the remote device and the user state data, wherein the start-up message indicates the remote device is being powered up; and
cause instructions to be transmitted to cause display of a plurality of selectable representations, in a browser on the remote device, of the respective one or more user-selected applications, wherein selection of one of the selectable representations causes advancement of the associated user-selected application to the respective one or more execution states.

20. An apparatus of claim 19, wherein the first data describes only the portion of the user interface that has changed since a last message received from the remote device, the remote device is a first remote device, and the apparatus is further configured to determine additional execution states of the one or more user-selected applications last reported are from a second remote device, different from the first remote device.

* * * * *